United States Patent
Ramachandran et al.

(10) Patent No.: US 9,336,373 B2
(45) Date of Patent: May 10, 2016

(54) USER BIOMETRIC PATTERN LEARNING AND PREDICTION

(71) Applicant: Verizon Patent and Licensing Inc., Basking Ridge, NJ (US)

(72) Inventors: Vidhyaprakash Ramachandran, Richardson, TX (US); Jay K. Jasti, Plano, TX (US); Yu Su, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

(21) Appl. No.: 14/253,068

(22) Filed: Apr. 15, 2014

(65) Prior Publication Data

US 2015/0294097 A1 Oct. 15, 2015

(51) Int. Cl.
*G06F 7/04* (2006.01)
*G06F 21/32* (2013.01)
*G06F 3/041* (2006.01)
*G06F 3/0488* (2013.01)

(52) U.S. Cl.
CPC .............. *G06F 21/32* (2013.01); *G06F 3/0414* (2013.01); *G06F 3/04883* (2013.01)

(58) Field of Classification Search
CPC ....... G06F 3/017; G06F 21/316; G06F 21/32; G06F 3/0414; H04L 29/06809
USPC .......................................................... 726/28
See application file for complete search history.

(56) References Cited

U.S. PATENT DOCUMENTS

| | | | | |
|---|---|---|---|---|
| 8,706,349 | B2* | 4/2014 | Rector et al. | 701/36 |
| 2007/0227489 | A1* | 10/2007 | Ando | 123/179.3 |
| 2007/0236330 | A1* | 10/2007 | Cho et al. | 340/5.54 |
| 2009/0150992 | A1* | 6/2009 | Kellas-Dicks et al. | 726/19 |
| 2011/0137520 | A1* | 6/2011 | Rector et al. | 701/36 |
| 2011/0321157 | A1* | 12/2011 | Davis et al. | 726/19 |
| 2012/0164978 | A1* | 6/2012 | Conti et al. | 455/411 |
| 2013/0111580 | A1* | 5/2013 | Checco | 726/19 |
| 2013/0263240 | A1* | 10/2013 | Moskovitch | 726/7 |
| 2013/0283378 | A1* | 10/2013 | Costigan et al. | 726/23 |
| 2013/0300582 | A1* | 11/2013 | McNamara et al. | 340/905 |
| 2014/0059446 | A1* | 2/2014 | Bromer | 715/744 |
| 2014/0229035 | A1* | 8/2014 | Rector et al. | 701/2 |
| 2015/0066823 | A1* | 3/2015 | Rubin et al. | 706/12 |

OTHER PUBLICATIONS

Ali et al, Keystroke Pressure Based Typing Biometrics Authentication System by Combining ANN and ANFIS-Based Classifiers, 2009, IEEE, pp. 198-203.*
Chang et al, Capturing Cognitive Fingerprint From Keystroke Dynamics, Jul. 2013, IEEE, pp. 24-28.*

* cited by examiner

*Primary Examiner* — Luu Pham
*Assistant Examiner* — Jenise Jackson

(57) ABSTRACT

A user device collects timing data that indicates screen touch timing behavior during multiple touch events associated with at least one of a hold time for a particular button or a transition time between two particular buttons. The user device also collects force data indicating screen touch force behavior during the multiple touch events. The user device identifies a user biometric pattern for the touch event based on the timing data and the force data, and stores the user biometric pattern.

20 Claims, 7 Drawing Sheets

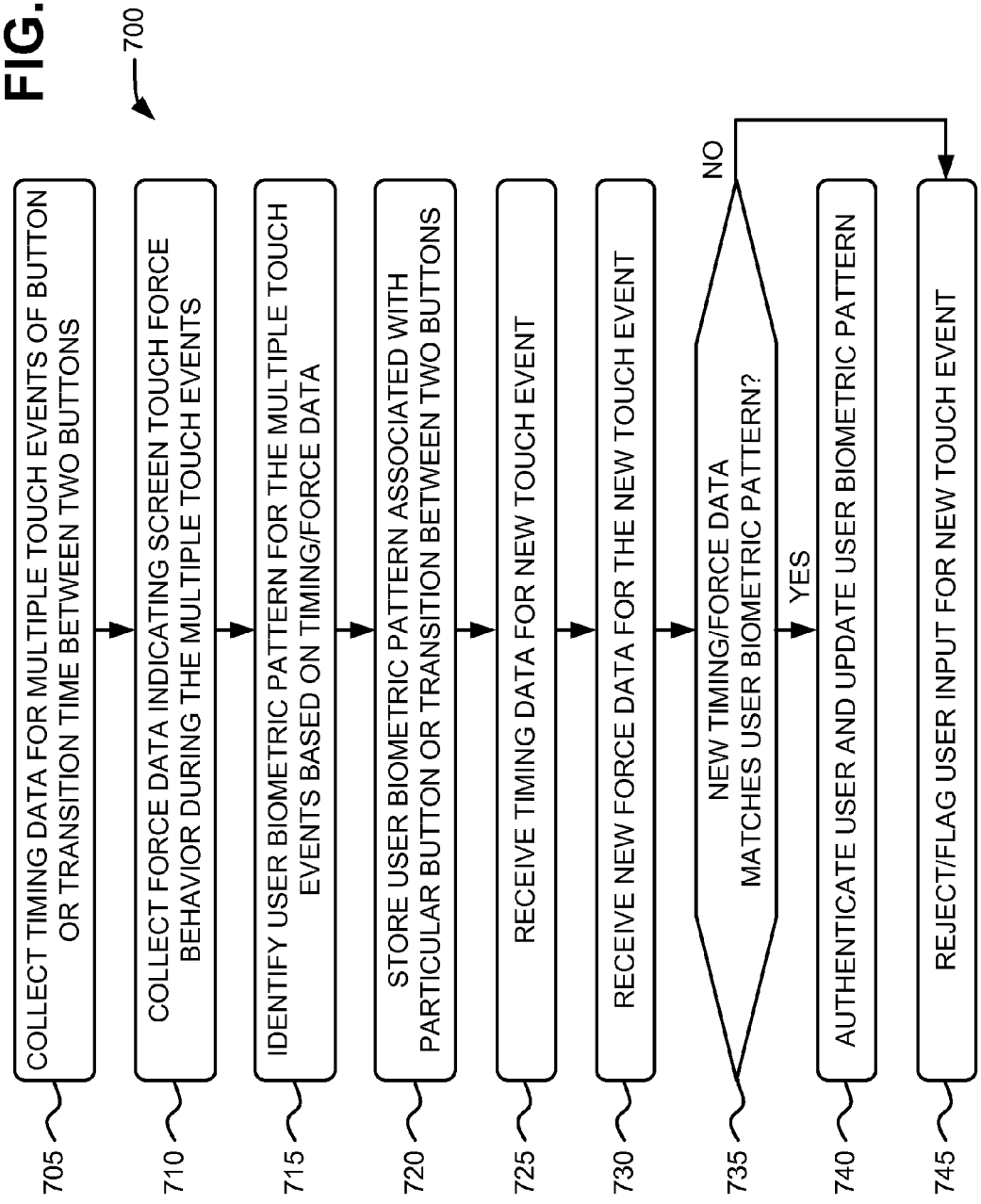

USER BIOMETRIC PATTERN LEARNING AND PREDICTION

BACKGROUND

Smartphone and tablet devices are widely used as user terminal interfaces. These devices are programmable and come with a growing number of powerful embedded sensors, such as an accelerometer, a gyroscope, a global positioning system (GPS), a digital compass, and a camera, which are enabling new sensing application across a wide variety of domains.

BRIEF DESCRIPTION OF THE DRAWINGS

FIG. 7 is a flow chart of an exemplary process for identifying a user biometric pattern, according to implementations described herein.

DETAILED DESCRIPTION OF PREFERRED EMBODIMENTS

The following detailed description refers to the accompanying drawings. The same reference numbers in different drawings may identify the same or similar elements.

Systems and methods described herein may detect an identity signature from user biometric patterns, such as screen touch timing behavior and/or screen touch force behavior.

Figure 1:
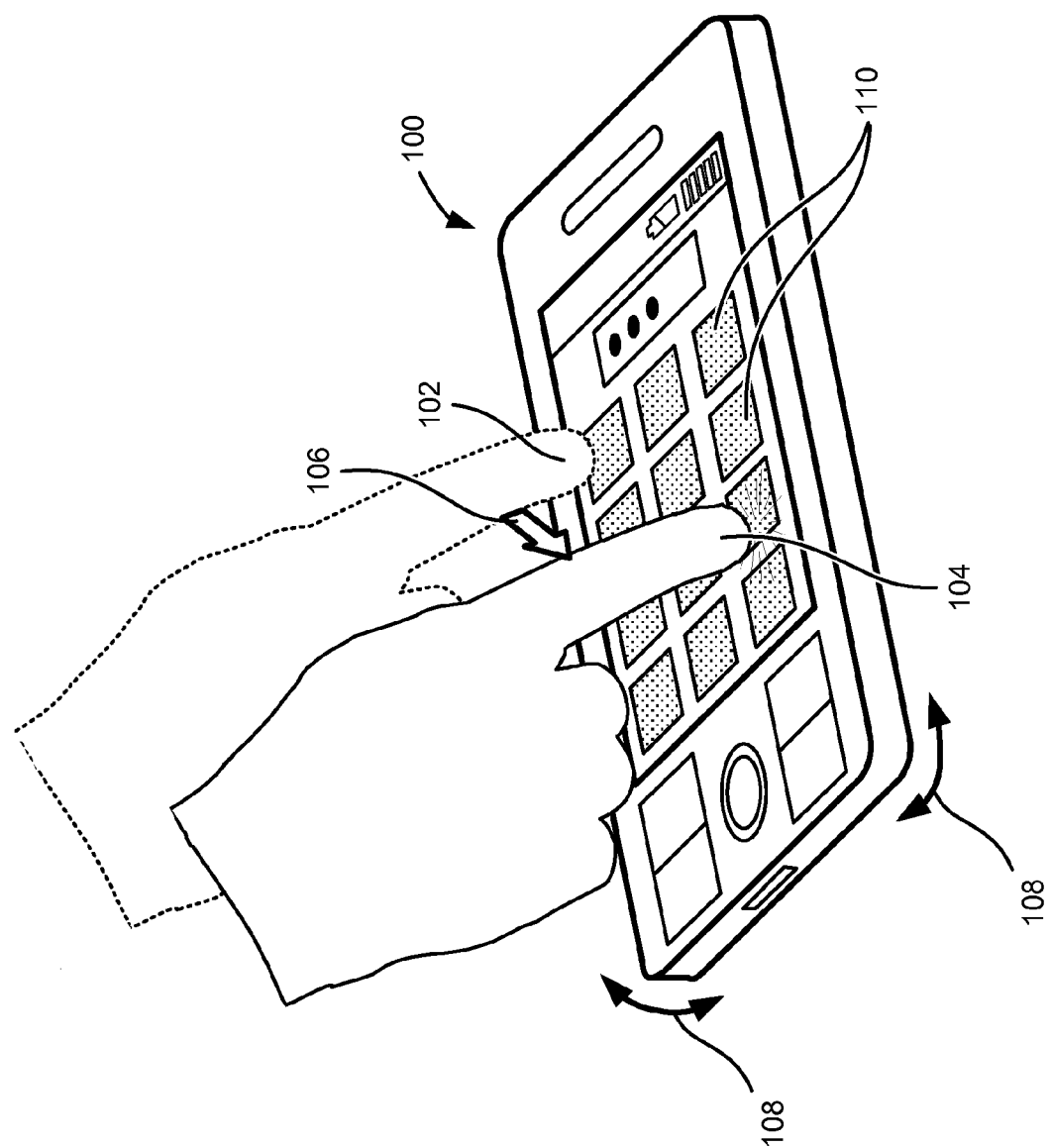
FIG. 1 is a diagram illustrating an exemplary implementation of concepts described herein.

FIG. 1 provides a diagram illustrating an exemplary implementation of concepts described herein. A user device 100 may include a number of embedded sensors, such as an accelerometer, a gyroscope, a GPS, a digital compass, and/or a camera that can be used to capture user pattern data. A user pattern learning and recognition system may use data provided by such sensors to determine an identity signature. Particularly, screen touch timing behavior patterns and/or screen touch force behavior patterns for an individual user may be identified and used as a form of identification and access control.

For example, as shown in FIG. 1, device 100 may prompt a user to enter a pass code to gain access to user device 100. Each user input of a button 110 (such as an alphanumeric key on a virtual keypad) may be a touch event, as well as the transition between two buttons 110. In FIG. 1, two touches 102 and 104 and one transition 106 are illustrated for simplicity. In conventional systems, the content of the pass code (e.g., the correct entry of a sequence of alphanumeric characters) may be used to verify a user. In implementations described herein, how the content of the pass code is entered may be used to verify the user (e.g., in conjunction with the code content).

Different users may have different timing behavior when they type characters (e.g., buttons 110) on user devices 100. Timing behavior can include the duration between button down (e.g., initial touch) and button up (e.g., button release) for a certain character (also referred to as a "hold time") or the time duration of a finger moving from one particular character to another particular character (also referred to as a "transition time"). Referring to FIG. 1, hold time may include, for example, the duration of a single touch 102 or 104. Transition time between touch 102 and 104 may be measured as a separate touch event, as illustrated by arrow 106.

The timing behavior (e.g., either the hold time or transition time) may be different due to a user's gender, age, time of day, day of week, occupation, or even the mood. It can also be influenced by the size of user device 100. For example, larger size screens on user device 100 may result in longer transition times than smaller size screens.

Different users may also use different screen touch forces when they touch a screen of user device 100. For example, the force used for touch event 102 and the force used for touch event 104 may provide a measurable pattern. User devices, such as user device 100, typically do not include a sensor that can directly detect the force applied to a screen. However, motions 108 of user device 100 during a touch event can be used to indirectly detect a touch force. Particularly, by reading the values of accelerometers and gyroscopes in user device 100, forces can be approximated if a user is holding device 100 when touching the screen. Conversely, if the user places device 100 on a solid surface (e.g., a table), accelerometers and gyroscopes would fail to detect the magnitude of the force. However, this case (of detecting no force) may be acceptable, since the act of a user putting device 100 on the table and typing characters can be considered a user pattern and can be learned as a user touching behavior.

According to one implementation described herein, a user device may collect timing data that indicates screen touch timing behavior during multiple touch events associated with a hold time for a particular button or a transition time between two particular buttons. The user device may also collect force data indicating screen touch force behavior during the multiple touch events. The user device may identify a user biometric pattern for the touch event based on the timing data and the force data, and may store the user biometric pattern.

According to another implementation, the user device may receive particular timing data and particular force data for a new touch event. The user device may compare the new timing data and the new force data to the previously-stored user biometric pattern and determine, based on the comparing, if the new timing data and the new force data correspond to the user biometric pattern.

Figure 2:
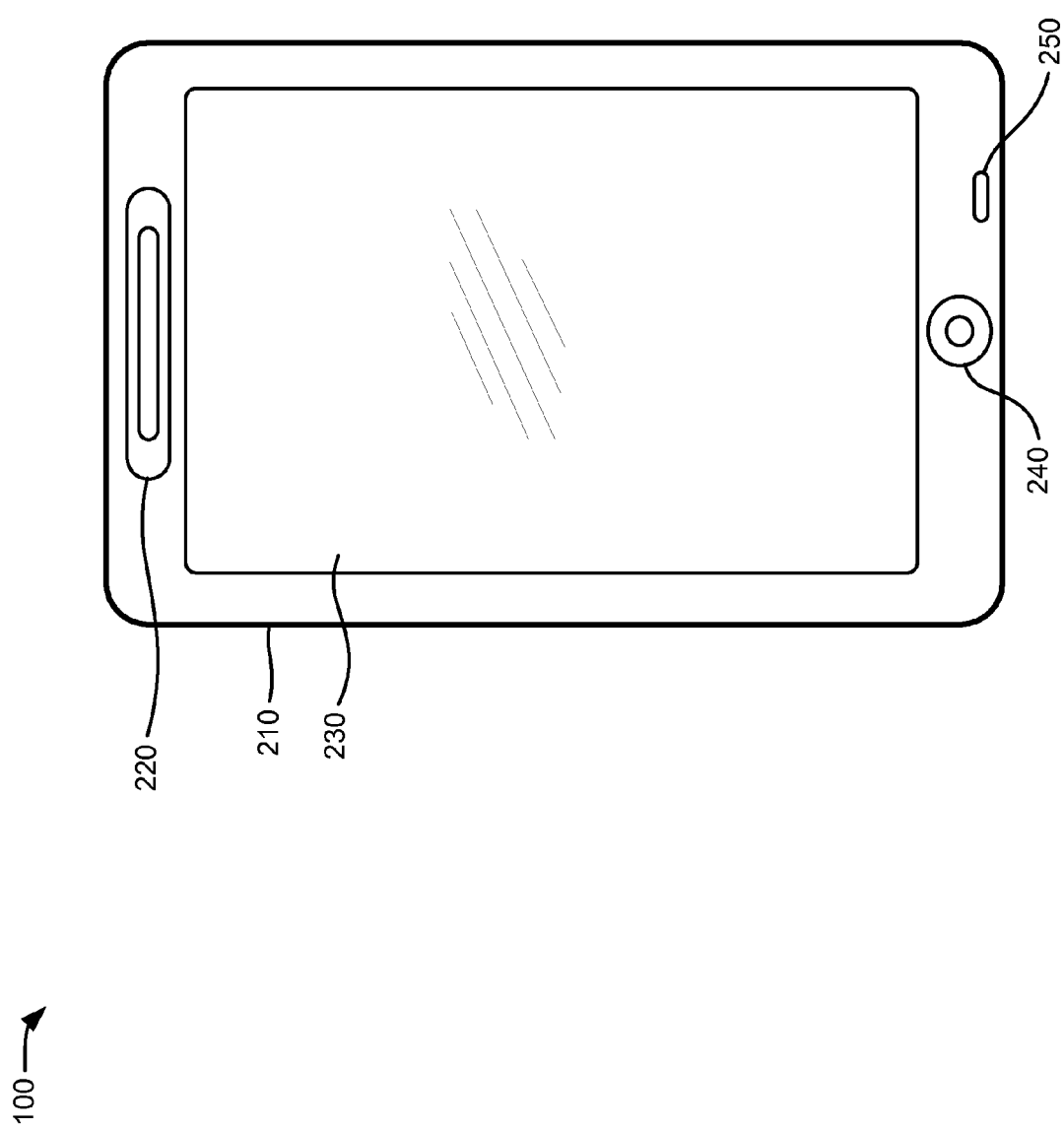
FIG. 2 is a diagram of an exemplary user device in which systems and/or methods described herein may be implemented.

FIG. 2 is a diagram of an exemplary user device 100. An exemplary user device 100 may include, for example, a smart phone, a handheld consumer electronic device, a tablet computer, a portable gaming system, a music-playing device, a GPS device, a camera, or another type of hand-held computational or communication device. As illustrated in FIG. 2, user device 100 may include a housing 210, a speaker 220, a display 230, control button(s) 240, and/or a microphone 250. Housing 210 may protect the components of user device 210 from outside elements. For example, housing 210 may be formed from plastic, metal, or a composite, and may be configured to support speaker 220, display 230, control button 240, and/or microphone 250.

Speaker 220 may provide audible information to a user of user device 100. Speaker 220 may be located in an upper portion of user device 100, and may function as an ear piece when a user is engaged in a communication session using user device 100. Speaker 220 may also function as an output device for audio information associated with games and/or video images played on user device 100.

Display 230 may provide visual information to the user. For example, display 230 may display text, images, video, and/or graphics received from another device, and/or relating to applications executed on user device 100. Display 230 may include a liquid crystal display (LCD), such as a thin film transistor (TFT) LCD, plasma display, etc.

In one implementation, display 230 may include a touch screen that may be configured to receive a user input when the user touches (or comes in close proximity to) display 230. For example, the user may provide an input to display 230 directly, such as via the user's finger, or via other devices, such as a stylus. User inputs received via display 230 may be processed by components and/or devices operating in user device 100. The touch-sensitive display 230 may permit the user to interact with user device 100 in order to cause user device 100 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 230 to be used as an input device. The touch-sensitive display 230 may also identify a duration of a touch (e.g., hold time), a duration between touches (e.g., transition time), and/or movement of a body part or a pointing device as it moves on or near the surface of the touch-sensitive display 230.

Control button(s) 240 may permit the user to interact with user device 100 to cause user device 100 to perform one or more operations. For example, control button 240 may be used to cause user device 100 to close an application, transmit information, or to cancel a command.

Microphone 250 may receive audible information from the user. For example, microphone 250 may receive audio signals from the user and may output electrical signals corresponding to the received audio signals.

Although FIG. 2 shows exemplary components of user device 100, in other implementations, user device 100 may contain fewer, different, differently-arranged, or additional components than depicted in FIG. 2. For example, in one implementation, user device 100 may also include an integrated or detachable keyboard. In still other implementations, a component of user device 100 may perform one or more tasks described as being performed by another component of user device 100.

Figure 3:
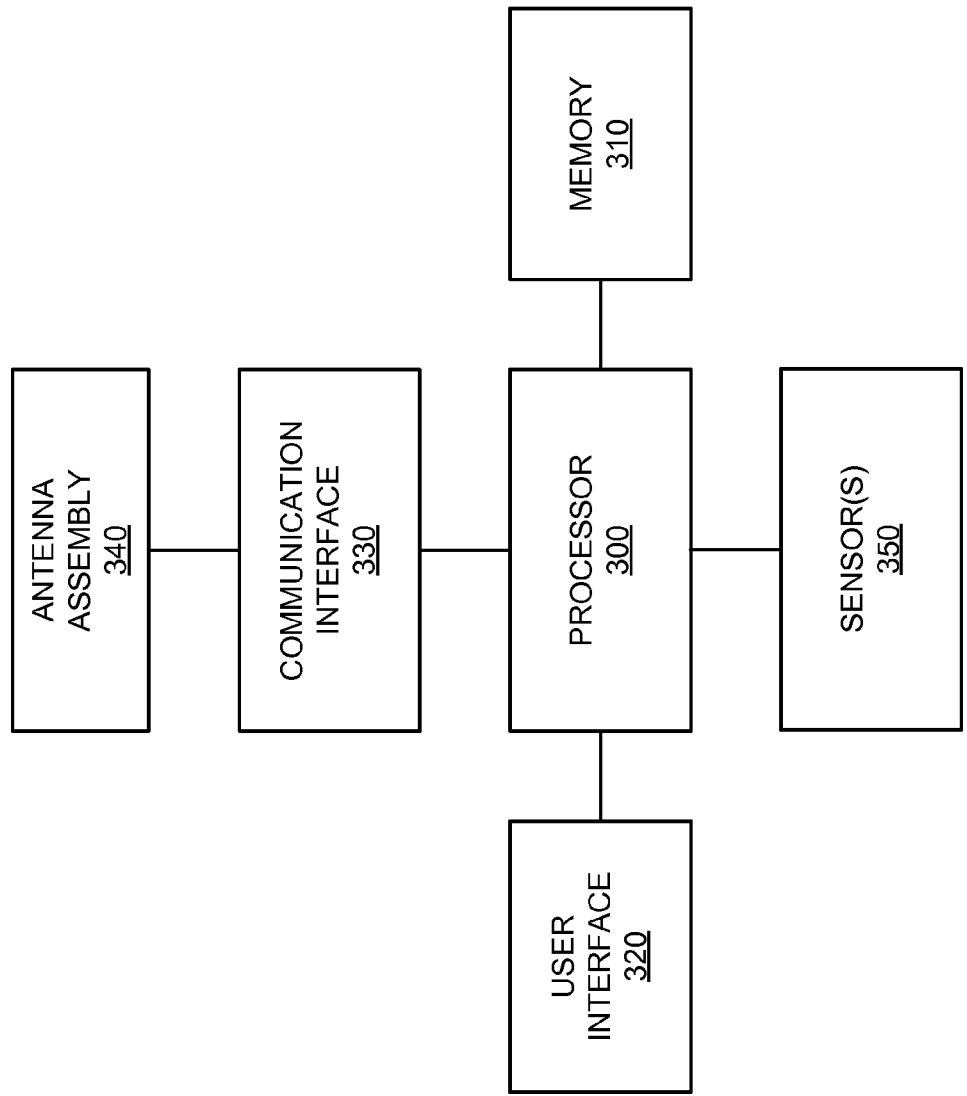
FIG. 3 is a block diagram of exemplary components of the user device illustrated in FIG. 2.

FIG. 3 is a diagram of exemplary components of user device 100. As illustrated, user device 100 may include a processor 300, a memory 310, a user interface 320, a communication interface 330, an antenna assembly 340, and/or sensors 350. User device 100 may include other components (not shown) that aid in receiving, transmitting, and/or processing data. Moreover, other configurations of components in user device 100 are possible.

Processor 300 may include one or more processors, microprocessors, application specific integrated circuits (ASICs), field programmable gate arrays (FPGAs), or the like. Processor 300 may control operation of user device 100 and its components. In one implementation, processor 300 may control operation of components of user device 100 in a manner described herein.

Memory 310 may include a random access memory (RAM) or another type of dynamic storage device that may store information and instructions, e.g., an application, for execution by processor 300; a read-only memory (ROM) device or another type of static storage device that may store static information and instructions for use by processor 300; and/or some other type of magnetic or optical recording medium and its corresponding drive, e.g., a hard disk drive (HDD), for storing information and/or instructions. In one implementation, memory 310 may store instructions and/or data used to display a graphical user interface, such as graphical user interface 100 on display 230.

User interface 320 may include mechanisms for inputting information to user device 100 and/or for outputting information from user device 100. Examples of input and output mechanisms might include buttons (e.g., control button 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and/or to output visual information; a vibrator to cause user device 100 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

Sensors 350 may collect and provide, to device 100, information that is used to detect, for example, timing (e.g., start/stop times for actions), motion (e.g., acceleration of user device 100), orientation (e.g., tilt), touch/proximity (e.g., a detectable distance or contact between a user and device 100), or other types of information. In another implementation, sensors 350 may include image capturing devices (e.g., a camera). Generally, according to implementations described herein, sensors 350 may provide indications of timing, touch, movement, orientation, and/or proximity that can be used (e.g., by user device 100) to detect behavior of a user providing input to user device 100.

As will be described in detail below, user device 100 may perform certain operations in response to processor 300 executing software instructions contained in a computer-readable medium, such as memory 310. A computer-readable medium may include a non-transitory memory device. A memory device may include space within a single physical memory device or spread across multiple physical memory devices. The software instructions may be read into memory 310 from another computer-readable medium or from another device via communication interface 330. The software instructions contained in memory 310 may cause processor 300 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of user device 100, in other implementations, user device 100 may contain fewer, different, differently-arranged, or additional components than depicted in FIG. 3. In still other implementations, a component of user device 100 may perform one or more other tasks described as being performed by another component of user device 100.

Figure 4:
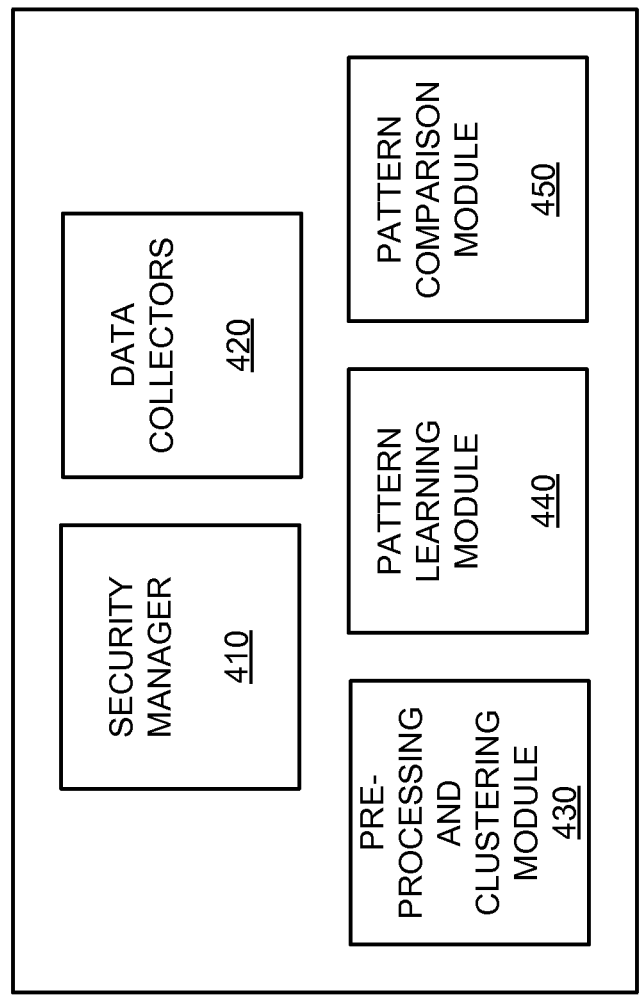
FIG. 4 is a block diagram of exemplary functional components of the user device illustrated in FIG. 3.

FIG. 4 provides a diagram of exemplary functional components of user device 100. The functional components may be implemented by, for example, processor 300 in conjunction with memory 310. As shown in FIG. 4, user device 100 may include a security manager 410, data collectors 420, a pre-processing and clustering module 430, a pattern learning module 440, and a pattern comparison module 450. User device 100 may also include other peripheral applications (not shown) that may require additional user authentication by users of user device 100.

Security manger 410 may restrict access to user device 100 or an application residing on user device 100 by presenting a challenge event. In one implementation, security manager 410 may present a challenge event by soliciting a password, secret code, or input pattern to be input by a user. In another implementation, security manager 410 may display an alphanumeric sequence that has to be entered (e.g., typed in) by the user. According to implementations described herein, security manager 410 may use an identity signature obtained from user biometric patterns (e.g., touch timing behavior and/or touch force behavior) during the challenge event to verify a user's authenticity. In one implementation, security manager 410 may prevent access to user device 100, or a particular application on user device 100, if the identity signature for a particular challenge event does not match stored user biometric patterns (e.g., within a particular degree of confidence).

Data collectors 420 may generally record data from sensors (e.g., sensors 350) for use by other functional modules, such as pre-processing and clustering module 430 described below. In one implementation, data collectors 420 may identify timing of touches and associated device movements (e.g., acceleration and orientation) on user device 100 in response to a challenge event (e.g., as initiated by security module 410) or another user input event. For example, data collectors 420 may detect a touch on one of buttons 110 and initiate a clock sequence to determine the duration (e.g., the hold time) of the touch on the selected button 110. As another example, data collectors 420 may detect the removal of a touch from one button 110 and initiate a clock sequence to determine the duration (e.g., the transition time) before another touch is received on another button 110 (or the same button 110). Additionally, data collectors 420 may detect the particular characters (e.g., buttons 110) associated with the determined hold time and/or transition time.

Figure 5:
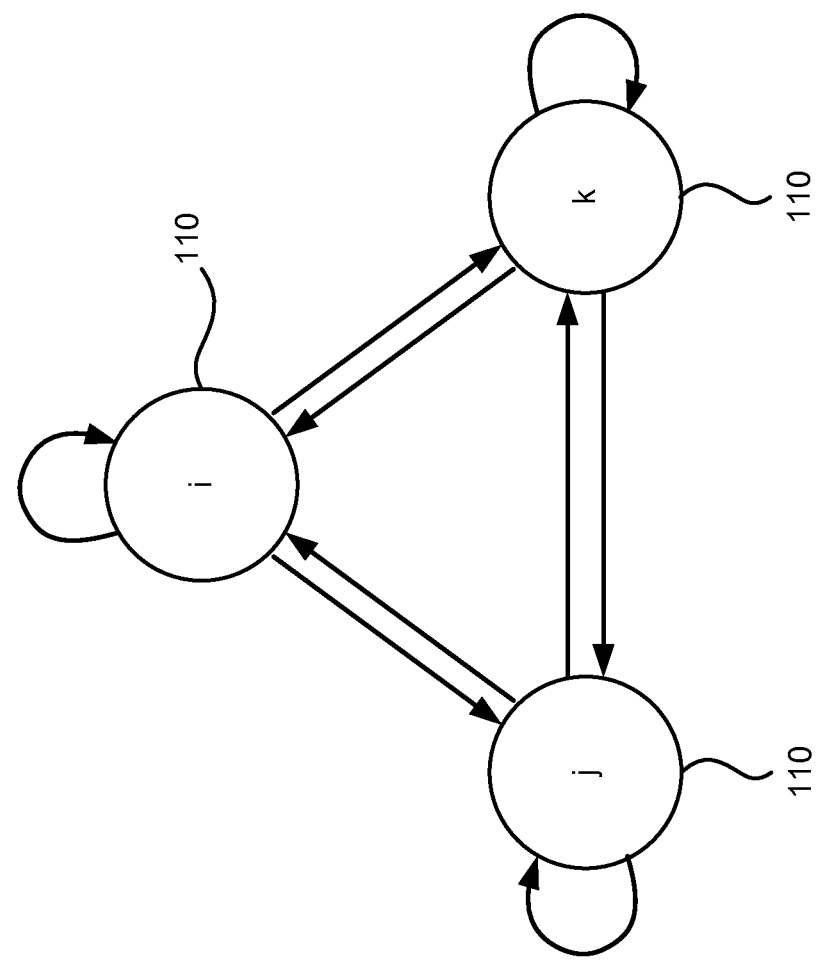
FIG. 5 is a simplified example of a directed graph according to an implementation described herein.

To learn the pattern of the user, a directed graph G=<V,E> can be constructed to represent the pattern of a user when he or she uses user device 100. FIG. 5 provides a simplified example of a directed graph 500 with three vertices (i, j, and k) and nine edges. More vertices, and a correspondingly more complex directed graph, may be used in a typical implementation. A vertex $v_i \epsilon V$ represents a button 110; and an edge $e_{i,j} \epsilon E$ indicates the user's finger moving, for example, from the ith button to jth button. More specifically, vertex $v_i \epsilon V$ contains data clusters of user behavior for the ith button, and edge $e_{i,j} \epsilon E$ contains data clusters of user behavior for the duration between the ith button and the jth button.

For the vertices indexed with i and j, $v_i \epsilon V$ and $v_j \epsilon V$, there is a directed edge connecting with vertices $v_i$ and $v_j$. Since G is a directed graph, therefore, the pairs of indexes <i, j> and <j, i> are different. There are two directed edges connecting between vertices $v_i$ and $v_j$. One directed edge emits from $v_i$ and ends with $v_j$. Another one emits from $v_j$ and ends with $v_i$. <i, i> is also considered as a valid pair of indexes.

Directed graph 500 provides a simplified example with three buttons and nine edge. However, if modeling buttons from 0 to 9 on a number pad, ten vertices are needed, which gives 100 edges. If modeling character buttons 'a' to 'z', directed graph G may need 26 vertices and 676 (e.g., 26*26) edges. Generally, given a directed graph G=<V,E>, let |V| denote the number of vertices and |E| denote the number of edges. There is the following relationship:

$$|E| = |V|^2 \quad (1)$$

Each vertex in the directed graph is associated with a certain button 110, which implies that the number of the vertices is equal to the number of keyboard symbols (e.g., the number of buttons 110 available for responding to a particular challenge event). If the keyboard only has digital numbers from 0 to 9, only ten vertices are needed. If modeling keyboard with characters from 'a' to 'z', twenty-six vertices are needed. Therefore, number of the vertices |V| depends on the number of keys on the keyboard (e.g., a virtual or physical keyboard).

A vertex can be viewed as a container that contains the clusters that describes the user behavior. The clusters in the ith vertex define the user behavior that happened in the time interval between the ith button down (e.g., initial touch) and up (e.g., release). To simplify the discussion, let $C^i$ denote the cluster set in the vertex $v_i \epsilon V$ and $c_k^i \epsilon C^i$ is a cluster in $C^i$.

The centroid of each cluster $Cid_k^i \epsilon C^i$ is a vector that can be defined as Equation 2:

$$Cid_k^i = <x_1, x_2, \ldots, x_n> \quad (2)$$

where $x_i$ is the element of centroid and n is the dimension of the centroid.

Each edge in the graph is associated with the user behavior that happens between the time when two buttons have been clicked (or touched). More specifically, the value of the edge $e_{i,j} \epsilon E$ is a set of clusters that describe the user behavior between the time interval of a user releasing the ith button and pushing the jth button down. One can then define the time duration between two buttons being clicked.

For example, one can use $C^{i,j}$ to denote the cluster set in the edge $e_{i,j}$. The centroid of each cluster $Cid_k^{i,j} = <x_1, x_2, \ldots, x_n> \epsilon C^{i,j}$, which has the same definition as the cluster centroid of vertices defined in Equation 2.

As noted above, multiple sensors 350 can be used to capture data during use of user device 100. Particularly, the sensors 350 that are sensitive to clicking may include a time clock, an accelerometer, and a gyroscope.

With respect to timing, as described above, the vertices and edges in a directed graph (e.g., directed graph 500) represent the touch events and time intervals between two sequential touch events. Definitions (1) and (2) define the time interval for the vertices and edges in milliseconds, where $\delta t_{v_i}$ and $\delta t_{e_{i,j}}$ denote the time intervals for the ith vertex and the edge $e_{i,j}$ respectively.

Definition 1.

$\delta t_{v_i} = t_{v_i}^d - t_{v_i}^u$: where $t_{v_i}^d$ and $t_{v_i}^u$ are timestamps of the ith button down and button up.

Definition 2.

$\delta t_{e_{i,j}} = t_{v_i}^u - t_{v_j}^d$: where ith button up and jth button down are two adjacent events and $t_{v_i}^u$ and $t_{v_j}^d$ are timestamps of the ith button up and the jth button down. Adjacent events indicate that these events happen in one session.

With respect to acceleration, given a time interval, an accelerometer outputs an ordered finite number of acceleration values. The number of values depends on the time interval and accelerometer frequency, where the highest accelerometer frequency only depends on the hardware itself. This implies that different user devices may have different accelerometer frequencies. The same situation is also applicable for gyroscope sensors, as described in more detail below. Therefore, one cannot assume a certain number of accelerometer or gyroscope readings that a user device can provide in a certain time interval. Ideally, the number of samples n=fq·δt, where fq is the frequency in Hz and δt represents a time interval. In real cases, the number of samples may vary because of many reasons such as sensitivity of hardware, too short time intervals, or vibration noise. Therefore, given a time interval δt, the output of accelerometers can be defined as Equation 3:

$$G_p = \begin{pmatrix} G^x \\ G^y \\ G^z \end{pmatrix} = \begin{pmatrix} g_1^x, g_2^x, \ldots, g_n^x \\ g_1^y, g_2^y, \ldots, g_m^y \\ g_1^z, g_2^z, \ldots, g_l^z \end{pmatrix} \quad (3)$$

where Gx, Gy, and Gz represent the vectors of three-axis accelerometer readings. Because of the uncertainty discussed above, the number of readings in three directions may not be the same. Here, <n, m, l>, n, m, l≥0, represents the number of readings in three directions.

Equation 4 gives the mean of the three axis accelerometer readings for a given time interval δt:

$$\overline{G}_p = \begin{pmatrix} \overline{G}^x \\ \overline{G}^y \\ \overline{G}^z \end{pmatrix} = \begin{pmatrix} \frac{\sum_{i=1}^{n} g_i^x}{n} \\ \frac{\sum_{i=1}^{m} g_i^y}{m} \\ \frac{\sum_{i=1}^{l} g_i^z}{l} \end{pmatrix} \quad (4)$$

Given a time interval δt, Equation 3 gives the outputs of three-axis accelerometers. Then the standard deviation ($\sigma G_p$) is computed as Equation 5 illustrates below:

$$\sigma(G_p) = \begin{pmatrix} \sigma(G^x) \\ \sigma(G^y) \\ \sigma(G^z) \end{pmatrix} = \begin{pmatrix} \sqrt{\frac{1}{n}\sum_{i=1}^{n}(g_i^x - \overline{G}^x)} \\ \sqrt{\frac{1}{m}\sum_{i=1}^{m}(g_i^y - \overline{G}^y)} \\ \sqrt{\frac{1}{l}\sum_{i=1}^{l}(g_i^z - \overline{G}^z)} \end{pmatrix} \quad (5)$$

First differentiation is a method to compute the slope at which a dependent output y changes with respect to the change in the independent input x. Here it can be assumed that the dependent is the output of three-axis accelerometers and the independent is time t. Given a sequence of readings from an accelerometer, G=<$g_1, g_2, \ldots, g_n$>. Based on the definition of discrete first derivative, the first differentiation of acceleration with respect to the time t can be deduced as follows:

$$G' = \frac{dG}{dt} = \frac{\sum_{i=2}^{n} \frac{g_i - g_{i-1}}{\delta t_i}}{n-1} \quad (6)$$

where G is a sequence of accelerometer readings, G=<$g_1, g_2, \ldots, g_n$>, $g_i$ is the acceleration at timestamp $t_i$, and $\delta t_i = t_i - t_{i-1}$.

The second derivative of a function is the derivative of the derivative of the function. Roughly, the second order derivative describes that the function is concave up or concave down. The second order differentiation of acceleration may be defined as Equation 7:

$$G'' = \frac{d^2 G}{dt^2} = \frac{2}{n-2}\sum_{i=3}^{n} \frac{(g_i - g_{i-1})/\delta t_i - (g_{i-1} - g_{i-2})/\delta t_{i-1}}{\delta t_i + \delta t_{i-1}} \quad (7)$$

where G is a sequence of accelerometer readings, G=<$g_1, g_2, \ldots, g_n$>, $g_i$ is the acceleration at timestamp $t_i$, and $\delta t_i = t_i - t_{i-1}$.

Given a time interval, a gyroscope outputs an ordered finite number of orientation values. The number of values depends on the time interval and gyroscope frequency, where the highest reading frequency depends on the hardware itself. This also implies that different user devices may have different gyroscope frequencies since they use different gyroscope hardware. Therefore, a certain number of gyroscope readings that a user device can provide in a certain time interval cannot be assumed. Ideally, number of samples n=fq·δt, where fq is the frequency in Hz and δt represents a time interval. In real cases, the number of samples may vary because of many reasons such as sensitivity of hardware of gyroscopes, too short time intervals, or vibration/rotation noise. Therefore, given a time interval t, the outputs of a gyroscope may be defined as Equation 8.

$$R_p = \begin{pmatrix} R^x \\ R^y \\ R^z \end{pmatrix} = \begin{pmatrix} r_1^x, r_2^x, \ldots, r_n^x \\ r_1^y, r_2^y, \ldots, r_m^y \\ r_1^z, r_2^z, \ldots, r_l^z \end{pmatrix} \quad (8)$$

where $R^x$, $R^y$, and $R^z$ stand for the vectors of three-axis gyroscope readings. Because of the uncertainty discussed above, the number of readings in three directions may not be the same. Here, <n, m, l>, n, m, l≥0, represents the number of readings.

Equation 9 gives the mean of the three axis gyroscope readings for a given time interval δt.

$$\overline{R}_p = \begin{pmatrix} \overline{R}^x \\ \overline{R}^y \\ \overline{R}^z \end{pmatrix} = \begin{pmatrix} \frac{\sum_{i=1}^{n} r_i^x}{n} \\ \frac{\sum_{i=1}^{m} r_i^y}{m} \\ \frac{\sum_{i=1}^{l} r_i^z}{l} \end{pmatrix} \quad (9)$$

Given a time interval δt, Equation 8 gives the outputs of a three-axis gyroscope. Then standard deviation is computed as Equation 10 illustrated below:

$$\sigma(R_p) = \begin{pmatrix} \sigma(R^x) \\ \sigma(R^y) \\ \sigma(R^z) \end{pmatrix} = \begin{pmatrix} \sqrt{\frac{1}{n}\sum_{i=1}^{n}(r_i^x - \overline{R}^x)} \\ \sqrt{\frac{1}{m}\sum_{i=1}^{m}(r_i^y - \overline{R}^y)} \\ \sqrt{\frac{1}{l}\sum_{i=1}^{l}(r_i^z - \overline{R}^z)} \end{pmatrix} \quad (10)$$

where $\overline{R}^x$, $\overline{R}^y$, and $\overline{R}^z$ are the means defined in Equation 9.

First differentiation is a method to compute the slope at which a dependent output y changes with respect to the change in the independent input x. Here it can be assumed that the dependent is the output of three-axis gyroscopes and the independent is time t. Given a sequence of readings from a gyroscope, $R=\langle r_1, r_2, \ldots, r_n\rangle$, and based on the definition of discrete first derivative, one can deduce the first differentiation of orientation respect to the time t as follows:

$$R' = \frac{dR}{dt} = \frac{\sum_{i=2}^{n} \frac{r_i - r_{i-1}}{\delta t_i}}{n-1} \quad (11)$$

where R is a sequence of gyroscope readings, $R=\langle r_1, r_2, \ldots, r_n\rangle$, $r_i$ is the orientation at timestamp $t_i$, and $\delta t_i = t_i - t_{i-1}$.

The second derivative of a function is the derivative of the derivative of the function. Thus, the second order differentiation of orientation may be defined as Equation 12:

$$R'' = \frac{d^2 R}{dt^2} = \frac{2}{n-2} \sum_{i=3}^{n} \frac{(r_i - r_{i-1})/\delta t_i - (r_{i-1} - r_{i-2})/\delta t_{i-1}}{\delta t_i + \delta t_{i-1}} \quad (12)$$

where R is a sequence of gyroscope readings, $R=\langle r_1, r_2, \ldots, r_n\rangle$, $r_i$ is the orientation at timestamp $t_i$, and $\delta t_i = t_i - t_{i-1}$.

As discussed in connection with data collectors 420 above, timing, acceleration, and orientation are collected when a user is using user devices 100, and particularly when security manager 410 activates data collectors 420. Before using this data to cluster user patterns, data pre-processing is needed. Pre-processing and clustering module 430 (FIG. 4) may perform the data pre-processing and clustering for data captured by user device sensors 350 for a number of different samples and use this information as a baseline for a use biometric pattern. As described further herein, pre-processing and clustering module 430 may perform processing and clustering for timing data, for acceleration data, and for orientation data.

Figure 6:
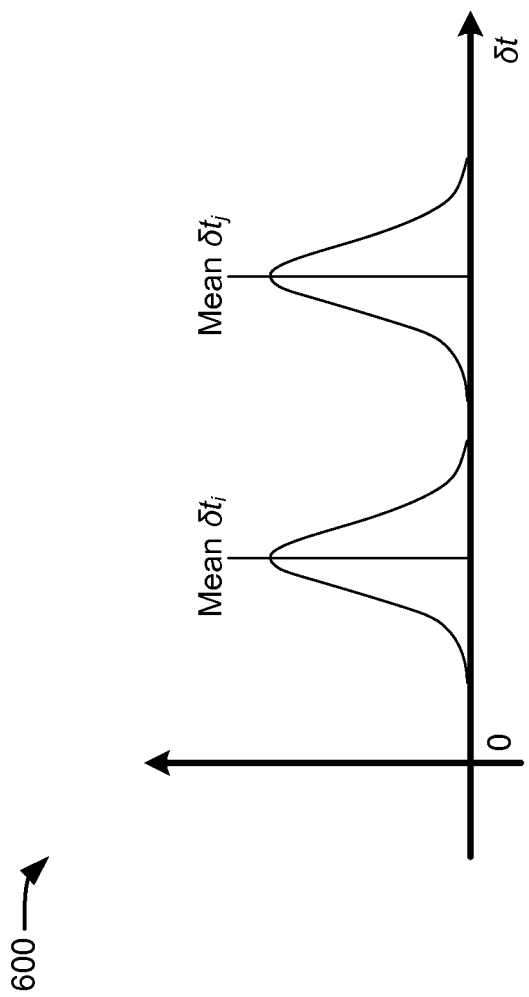
FIG. 6 provides a sample graph of exemplary timing patterns according to an implementation described herein.

With respect to timing, a user may have multiple timing patterns when they click a button 110 or clicks between buttons 110. For example, users may type faster during the daytime than they do during the night. Based on the Definitions 1 and 2 defined above, which defines the time interval $\delta t$ for the vertices and edges respectively, multiple user patterns result in multiple peaks of the mean of the time intervals $\delta t$. Based on the central limit theorem, one can expect that, within each timing pattern, the mean of $\delta t$ is approximately normally distributed. FIG. 6 provides a sample graph 600 of exemplary timing patterns. More particularly, graph 600 illustrates two timing patterns, for $\delta t_i$ and $\delta t_j$ respectively, shown with a normal distribution.

Before building the timing pattern for users, mean and standard deviation of $\delta t$ are introduced, which are defined as Equations 13 and 14.

$$\overline{\delta t} = \frac{\sum_{i=1}^{n} \delta t_i}{n} \quad (13)$$

$$\sigma(\delta t) = \sqrt{\frac{\sum_{i=1}^{n}(\delta t_i - \overline{\delta t})^2}{n}} \quad (14)$$

where $\delta t_i$ is the ith time interval and n is the number of points.

Using Equation 13 and 14 to compute the mean and standard deviation, as the equations illustrate, can require large amounts of memory to store all the time points. To compute standard deviation, Equation 14 requires traversing all the time points twice, which results in high computational time and space complexity. Then one can give the recursive equations as follows.

$$\overline{\delta t} = \frac{n\overline{\delta t} + \delta t}{n+1} \quad (15)$$

$$\sigma(\delta t)^2 = \frac{\sum_{i=1}^{n}(\delta t_i - \overline{\delta t})^2}{n} \quad (16)$$

$$= \frac{\sum_{i=1}^{n-1}(\delta t_i - \overline{\delta t})^2 + (\delta t_n - \overline{\delta t})^2}{n}$$

$$= \frac{\sum_{i=1}^{n-1}(\delta t_i - \overline{\delta t})^2}{n} + \frac{(\delta t_n - \overline{\delta t})^2}{n}$$

$$= \frac{(n-1)\sum_{i=1}^{n-1}(\delta t_i - \overline{\delta t})^2}{(n-1)n} + \frac{(\delta t_n - \overline{\delta t})^2}{n}$$

$$\approx \frac{(n-1)}{n}\sigma(\delta t)^2 + \frac{(\delta t_n - \overline{\delta t})^2}{n}$$

where Equation 15 computes the time interval mean recursively and Equation 16 calculates the standard deviation recursively.

Based on the central limit theorem, one can expect that, within each timing pattern, the mean of $\delta t$ is approximately normally distributed. Under this assumption, the empirical rule (also known as 68-95-99.7 rule or the three-σ rule) indicates that nearly all (99.7%) of $\delta t$ data points lie within 3 standard deviations of the mean. Therefore, the clusters of $\delta t$ can be defined as:

Definition 3.

Cluster of $\delta t$

Centroid: mean of $\delta t$ within the clusters by Equation 15.

Radius: $r = k \cdot \sigma(\delta t)$, where k is a float number $\geq 3$ and $\sigma(\delta t)$ is given by Equation 16.

Hittime: h, number of data points are clustered to the clusters.

To construct clusters of $\delta t$, an initial cluster radius is needed. Let $r_0$ indicate this initial radius, which can be defined as an expected value of $k \cdot \sigma(\delta t)$. This expected value can be estimated by the experimental $\delta t$ variance. Then the clustering algorithm is described as follows:

1. Assume an input $\delta t$;
2. Compare $\delta t$ with all the existing clusters if $\delta t \in [\overline{\delta t}_i - k \cdot \sigma(\delta t)_i, \overline{\delta t}_i + k \cdot \sigma(\delta t)_i]$. If such a cluster exists, such as the ith cluster, the algorithm proceeds to step 3. If no such a cluster exists, the algorithm proceeds to step 4;

3. For the ith cluster, centroid and radius are updated by Equations (15) and (16) respectively. Hittime $h_i=h_i+1$;

4. A new cluster is created with centroid $\delta t$ and radius $r_0$, which is an initial radius. Set $h_i=1$.

Multiple clusters would be created after accumulating enough user data. Based on hittime of clusters, given an incoming $\delta t$, the confidence degree, $cf_{\delta t}$, is defined as Equation 17.

$$cf_{\delta t} = \frac{h_j}{\sum_{i=1}^{n} h_i} \quad (17)$$

where j represents the jth cluster to which $\delta t$ is clustered and n is the total number of the clusters.

Besides the confidence degree, $cf_{\delta t}$, $ac_{\delta t}$ is introduced to indicate the distance between the input data point I and the centroid of the cluster that this data point falls into.

$$ac_{\delta t} = \frac{1}{\sqrt{2\pi} \cdot \sigma(\delta t)} \exp\left(-\frac{(\delta t - \overline{\delta t})}{2 \cdot \sigma(\delta t)^2}\right) \quad (18)$$

where $\overline{\delta t}$, defined by Equation 15, is the centroid of the cluster that the data point $\delta t$ falls into, $\sigma(\delta t)^2$, given by Equation 16, is the standard deviation of the cluster.

With respect to acceleration, pre-processing and clustering module 430 may perform additional pre-processing and clustering. As discussed above, when a user uses user device 100, for each time interval $\delta t$ defined by Definitions 1 and 2, three directional acceleration values are captured independently by the accelerometers. Means of these three directional acceleration values are computed as one of the pattern features. Based on the central limit theorem, one can expect that the means of acceleration are approximately normally distributed. As the three directional acceleration values and orientation values are captured independently, one can assume that features of mean, standard deviation, first order derivative, and second order derivative on three directions, (x, y, and z), are independent variables.

A vector random variable $X=[X_1, X_2 \ldots, X_n]^T$ may have a multi-variate normal distribution with mean $\mu \in R^n$ and covariance matrix $\Sigma \in S_{++}^n$, if its probability density function is given by $$p(x;\mu,\Sigma) = \frac{1}{(2\pi)^{n/2}|\Sigma|^{1/2}} \exp\left(\frac{1}{2}(x-\mu)^T \Sigma^{-1}(x-\mu)\right) \quad (19)$$

where $\Sigma \in S_{++}^n$ is the space of symmetric positive definition n×n matrices, defined as $S_{++}^n = \{A \in R^{n \times n}: A=A^T \text{ and } x^T A x > 0 \text{ for all } x \in R^n \text{ such that } x \neq 0\}$.

Equation 4 above gives the three axis accelerometer readings for a given time interval $\delta t$. Since three axis x, y, and z are independent acceleration variables, one can expect that means of these independent acceleration variables are approximately normally distributed within a user pattern. In other words, $\overline{G}_p = [\overline{G}^x, \overline{G}^y, \overline{G}^z]^T$, within a user pattern, falls into a multivariate normal distribution with mean $\mu(\overline{G}_p) = [\mu(\overline{G}^x), \mu(\overline{G}^y), \mu(\overline{G}^z)]^T$ and covariance matrix $\mu(\overline{G}_p)$, which is described as follows:

$$p(\overline{G}_p; \mu(\overline{G}_p), \Sigma(\overline{G}_p)) = \quad (20)$$
$$\frac{1}{(2\pi)^{n/2}|\Sigma(\overline{G}_p)|^{1/2}} \exp\left(\frac{1}{2}(\overline{G}_p - \mu(\overline{G}_p))^T \Sigma(\overline{G}_p)^{-1}(\overline{G}_p - \mu(\overline{G}_p))\right)$$

where $\overline{G}_p = [\overline{G}^x, \overline{G}^y, \overline{G}^z]^T$ is defined by Equation 4, $\mu(\overline{G}_p) = [\mu(\overline{G}^x), \mu(\overline{G}^y), \mu(\overline{G}^z)]^T$, which is given by Equation 21; covariance matrix $\Sigma(\overline{G}_p)$ is given by Equation 22.

$$\mu(\overline{G}_p) = \begin{pmatrix} \mu(\overline{G}^x) \\ \mu(\overline{G}^y) \\ \mu(\overline{G}^z) \end{pmatrix} = \begin{pmatrix} \frac{\sum_{i=1}^{n} \overline{G}_i^x}{n} \\ \frac{\sum_{i=1}^{m} \overline{G}_i^y}{m} \\ \frac{\sum_{i=1}^{l} \overline{G}_i^z}{l} \end{pmatrix} \quad (21)$$

$$\Sigma(\overline{G}_p) = \begin{bmatrix} \sigma^2(\overline{G}^x) & 0 & 0 \\ 0 & \sigma^2(\overline{G}^y) & 0 \\ 0 & 0 & \sigma^2(\overline{G}^z) \end{bmatrix} \quad (22)$$

where $\sigma(\cdot)$ represents the standard deviation of $\cdot$. For the computation of mean $\mu(\overline{G}_p)=[\mu(\overline{G}^x), \mu(\overline{G}^y), \mu(\overline{G}^z)]^T$ and covariance matrix $\Sigma(\overline{G}_p)$, the similar methods are used as illustrated in Equations 15 and 16.

Based on the central limit theorem, one can expect that, within each acceleration pattern, the mean of acceleration $\mu(\overline{G}_p)=[\mu(\overline{G}^x), \mu(\overline{G}^y), \mu(\overline{G}^z)]^T$ is approximately multivariate normally distributed. Therefore, based on empirical rule, almost all the data points within an acceleration pattern fall in the space of three standard deviations around the means. Then the clusters of acceleration may be defined as:

Definition 4.

Cluster of $\overline{G}_p$

Centroid: mean of $\overline{G}_p$, $\mu(\overline{G}_p)=[\mu(\overline{G}^x), \mu(\overline{G}^y), (\overline{G}^z)]^T$ within the clusters by Equation 21.

Radius: $r_x = k \cdot \sigma(\overline{G}^x)$, $r_y = k \cdot \sigma(\overline{G}^y)$, and $r_z = k \cdot \sigma(\overline{G}^z)$ where k is afloat number $\geq 3$ and $[\sigma(\overline{G}^x), \sigma(\overline{G}^y), \sigma(\overline{G}^z)]^T$ is given by Equation 22.

Hittime: h, number of data points are clustered to the clusters.

Since acceleration is collected at three directions independently, one can assume that the readings from three-axis accelerometers are independent, which explains that covariance matrix $\Sigma(\overline{G}_p)$ given by Equation 22 is a diagonal matrix. Ideally, if one can visualize the clusters of three-axis acceleration, it should give a prolate spheroid. To reduce the complexity, the cluster radius is simplified as defined in Definition (4), which defines the radius in three directions independently.

To construct clusters of $\overline{G}_p$, an initial cluster radius is needed. Let $r(\overline{G}_p)_0$ indicate this initial radius, which is defined as an expected value of $k \cdot \sigma(\overline{G}_p)$. This expected value can be estimated by the experimental $\overline{G}_p$ variance. Then the clustering algorithm is described as follows:

1. Assume an input $\overline{G}_p = [\overline{G}^x, \overline{G}^y, \overline{G}^z]$;

2. Compare $\overline{G}_p$ with all the existing clusters if $\overline{G}^x \in [\mu(\overline{G}^x)_i - k \cdot \sigma(\overline{G}^x)_i, \mu(\overline{G}^x)_i + k \cdot \sigma(\overline{G}^x)_i]$ and $\overline{G}^y \in [\mu(\overline{G}^y)_i - k \cdot \sigma(\overline{G}^y)_i, \mu(\overline{G}^y)_i + k \cdot \sigma(\overline{G}^y)_i]$ and $\overline{G}^z \in [\mu(\overline{G}^z)_i - k \cdot \sigma(\overline{G}^z)_i, \mu(\overline{G}^z)_i + k \cdot \sigma(\overline{G}^z)_i]$. If such a cluster exists, such as the ith cluster, the algorithm proceeds to step 3. If no such cluster exists, the algorithm proceeds to step 4;

3. For the ith cluster, centroid and radius are updated by Equations (21) and (22), respectively. Hittime $h_i=h_i+1$;
4. A new cluster is created with centroid $\overline{G}_p=[\overline{G}^x, \overline{G}^y, \overline{G}^z]$ and radius $r(\overline{G}_p)_0$, which is an initial radius. Set $h_i=1$.

Multiple clusters would be created after accumulating enough user data. Based on hittime of clusters, given an incoming $\overline{G}_p=[\overline{G}^x, \overline{G}^y, \overline{G}^z]$, the confidence degree, $cf_{\overline{G}_p}$, is defined as Equation 23.

$$cf_{\overline{G}_p} = \frac{h_j}{\sum_{i=1}^{n} h_i} \quad (23)$$

where j represents the jth cluster to which $cf_{\overline{G}_p}$ is clustered and n is the total number of the clusters.

Besides the confidence degree, $cf_{\overline{G}_p}$, $ac_{\overline{G}_p}$ is introduced to indicate the distance between the input data point $\overline{G}_p$ and the centroid of the cluster that this data point falls into.

$$ac_{\overline{G}_p} = \frac{1}{(2\pi)^{n/2}|\Sigma(\overline{G}_p)|^{1/2}} \exp\left(\frac{1}{2}(\overline{G}_p - \mu(\overline{G}_p))^T \Sigma(\overline{G}_p)^{-1}(\overline{G}_p - \mu(\overline{G}_p))\right) \quad (24)$$

where $\mu(\overline{G}_p)$, defined by Equation 21, is the centroid of the cluster that the data point $\overline{G}_p$ falls into, $\Sigma(\overline{G}_p)$, given by Equation 22, is the standard deviation of the cluster.

Equation 6 above gives the first order differentiation of acceleration with respect to the time t, $G(\delta t)'=[G(\delta_t)'_x, G(\delta_t)'_y, G(\delta_t)'_z]^T$. Similar methods of clustering acceleration mean can be used to cluster the three-axis first order differentiation acceleration.

Since the three-axes x, y, and z are independent acceleration variables, one can expect that, $G(\delta_t)'=[G(\delta_t)'_x, G(\delta_t)'_y, G(\delta_t)'_z]^T$, within a user pattern, falls into a multivariate normal distribution with mean $\mu(G(\delta_t)')=[\mu(G(\delta_t)'_x), \mu(G(\delta_t)'_y), \mu(G(\delta_t)'_z)]^T$ and covariance matrix $\Sigma(G(\delta_t)')$, which is described as follows:

$$p(G(\delta_t)'; \mu(G(\delta_t)'), \Sigma(G(\delta_t)')) = \frac{1}{(2\pi)^{n/2}|\Sigma(G(\delta_t)')|^{1/2}} \quad (25)$$

$$\exp\left(\frac{1}{2}(G(\delta_t)' - \mu(G(\delta_t)'))^T \Sigma(G(\delta_t)')^{-1}(G(\delta_t)' - \mu(G(\delta_t)'))\right)$$

where $G(\delta_t)'=[G(\delta_t)'_x, G(\delta_t)'_y, G(\delta_t)'_z]^T$ is defined by Equation 6, $\mu(G(\delta_t)')=[\mu(G(\delta_t)'_x), \mu(G(\delta_t)'_y), \mu(G(\delta_t)'_z)]^T$, which is given by equation 26; covariance matrix $\Sigma(G(\delta_t)')$ is given by Equation 27.

$$\mu(G(\delta_t)') = \begin{pmatrix} \mu(G(\delta_t)'_x) \\ \mu(G(\delta_t)'_y) \\ \mu(G(\delta_t)'_z) \end{pmatrix} = \begin{pmatrix} \frac{\sum_{i=1}^{n} G(\delta_t)_x i'}{n} \\ \frac{\sum_{i=1}^{m} G(\delta_t)_y i'}{m} \\ \frac{\sum_{i=1}^{l} G(\delta_t)_z i'}{l} \end{pmatrix} \quad (26)$$

-continued $$\Sigma(G(\delta_t)') = \begin{bmatrix} \sigma^2(G(\delta_t)'_x) & 0 & 0 \\ 0 & \sigma^2(G(\delta_t)'_y) & 0 \\ 0 & 0 & \sigma^2(G(\delta_t)'_z) \end{bmatrix} \quad (27)$$

Based on the central limit theorem, one can expect that, within each acceleration pattern, the first order derivative of acceleration $G(\delta_t)'=[G(\delta_t)'_x, G(\delta_t)'_y, G(\delta_t)'_z]^T$ is approximately multivariate normally distributed. Therefore, one can define the clusters of first order derivative acceleration as:

Definition 5.

Cluster of $G(\delta_t)'$

Centroid: $\mu(G(\delta_t)')=[\mu(G(\delta_t)'_x), \mu(G(\delta_t)'_y), \mu(G(\delta_t)'_z)]^T$ within the clusters by Equation 26.

Radius: $r_x=k\cdot\sigma(G(\delta_t)'_x)$, $r_y=k\cdot\sigma(G(\delta_t)'_y)$, $r_z=k\cdot\sigma(G(\delta_t)'_z)$, where k is a float number $\geq 3$ and $[\sigma(G(\delta_t)'_x), \sigma(G(\delta_t)'_y), \sigma(G(\delta_t)'_z)]^T$ is given by Equation 27.

Hittime: h, number of data points are clustered to the clusters.

By the same concepts as the previous section, since acceleration is collected at three directions independently, covariance matrix $\Sigma(G(\delta_t)')$, given by Equation 27 is a diagonal matrix. To reduce the complexity, the cluster radius may be simplified as defined in Definition (5), which defines the radius in three directions independently.

To construct clusters of $G(\delta_t)'$, an initial cluster radius is needed. Let $r(G(\delta_t)')_0$ indicate this initial radius, which is defined as an expected value of $k\cdot\sigma(G(\delta_t)')$. This expected value can be estimated by the experimental $G(\delta_t)'$ variance. Then the clustering algorithm is described as follows:

1. Assume an input $G(\delta_t)'=[G(\delta_t)'_x, G(\delta_t)'_y, G(\delta_t)'_z]^T$;
2. Compare $G(\delta_t)'$ with all the existing clusters if $G(\delta_t)'_x \in [\mu(G(\delta_t)'_x)_i-k\cdot\sigma(G(\delta_t)'_x)_i, \mu(G(\delta_t)'_x)_i+k\cdot\sigma(G(\delta_t)'_x)_i]$ and $G(\delta_t)'_y \in [\mu(G(\delta_t)'_y)_i-k\cdot\sigma(G(\delta_t)'_y)_i, \mu(G(\delta_t)'_y)_i+k\cdot\sigma(G(\delta_t)'_y)_i]$ and $G(\delta_t)'_z \in [\mu(G(\delta_t)'_z)_i-k\cdot\sigma(G(\delta_t)'_z)_i, \mu(G(\delta_t)'_z)_i+k\cdot\sigma(G(\delta_t)'_z)_i]$. If such a cluster exists, such as the ith cluster, the algorithm proceeds to step 3. If no such a cluster exists, the algorithm proceeds to step 4;
3. For the ith cluster, centroid and radius are updated by Equations 26 and 27 respectively. Hittime $hi=hi+1$;
4. A new cluster is created with centroid $G(\delta_t)'=[G(\delta_t)'_x, G(\delta_t)'_y, G(\delta_t)'_z]$ and radius $r(G(\delta_t)')_0$, which is an initial radius. Set $h_i=1$.

Multiple clusters would be created after accumulating enough user data. Based on hittime of clusters, given an incoming $G(\delta_t)'=[G(\delta_t)'_x, G(\delta_t)'_y, G(\delta_t)'_z]$, the confidence degree $cf_{G(\delta_t)'}$ is defined as Equation 28.

$$cf_{G(\delta_t)'} = \frac{h_j}{\sum_{i=1}^{n} h_i} \quad (28)$$

where j represents the jth cluster to which $cf_{G(\delta_t)'}$ is clustered and n is the total number of the clusters.

Besides the confidence degree, $cf_{G(\delta_t)'}$, $ac_{G(\delta_t)'}$ is introduced to indicate the distance between the input data point $G(\delta_t)'$ and the centroid of the cluster that this data point falls into.

$$ac_{G(\delta_t)'} = \frac{1}{(2\pi)^{n/2}|\Sigma(G(\delta_t)')|^{1/2}} \quad (29)$$

-continued $$\exp\left(\frac{1}{2}(G(\delta_t)' - \mu(G(\delta_t)'))^T \Sigma(G(\delta_t)')^{-1}(G(\delta_t)' - \mu(G(\delta_t)'))\right)$$

where $\mu(G(\delta_t)')$, defined by Equation 26 is the centroid of the cluster that the data point $G(\delta_t)'$ falls into, $\Sigma(G(\delta_t)')$, given by Equation 27 is the standard deviation of the cluster.

Equation 7 above gives the second order differentiation of acceleration with respect to the time t, $G(\delta_t)''=[G(\delta_t)''_x, G(\delta_t)''_y, G(\delta_t)''_z]^T$. Here one can use the similar methods of clustering the first order differentiation acceleration to cluster the three-axis second order differentiation acceleration during the time interval $\delta_t$.

Since the three axes x, y, and z are independent acceleration variables, one can expect that, $G(\delta_t)''=[G(\delta_t)''_x, G(\delta_t)''_y, G(\delta_t)''_z]^T$, within a user pattern, falls into a multivariate normal distribution with mean $\mu(G(\delta_t)'')=[\mu(G(\delta_t)''_x), \mu(G(\delta_t)''_y), \mu(G(\delta_t)''_z)]^T$ and covariance matrix $\Sigma(G(\delta_t)'')$, which is described as follows:

$$p(G(\delta_t)''; \mu(G(\delta_t)''), \Sigma(G(\delta_t)'')) = \frac{1}{(2\pi)^{n/2}|\Sigma(G(\delta_t)'')|^{1/2}} \tag{30}$$

$$\exp\left(\frac{1}{2}(G(\delta_t)'' - \mu(G(\delta_t)''))^T \Sigma(G(\delta_t)'')^{-1}(G(\delta_t)'' - \mu(G(\delta_t)''))\right)$$

where $G(\delta_t)''=[G(\delta_t)''_x, G(\delta_t)''_y, G(\delta_t)''_z]^T$ is defined by Equation 7, $\mu(G(\delta_t)'')=[\mu(G(\delta_t)''_x), \mu(G(\delta_t)''_y), \mu(G(\delta_t)''_z)]^T$, which is given by Equation 31; covariance matrix $\Sigma(G(\delta_t)')$ is given by Equation 32.

$$\mu(G(\delta_t)'') = \begin{pmatrix} \mu(G(\delta_t)''_x) \\ \mu(G(\delta_t)''_y) \\ \mu(G(\delta_t)''_z) \end{pmatrix} = \begin{pmatrix} \frac{\sum_{i=1}^{n} G(\delta_t)_x i''}{n} \\ \frac{\sum_{i=1}^{m} G(\delta_t)_y i''}{m} \\ \frac{\sum_{i=1}^{l} G(\delta_t)_z i''}{l} \end{pmatrix} \tag{31}$$

$$\Sigma(G(\delta_t)'') = \begin{bmatrix} \sigma^2(G(\delta_t)''_x) & 0 & 0 \\ 0 & \sigma^2(G(\delta_t)''_y) & 0 \\ 0 & 0 & \sigma^2(G(\delta_t)''_z) \end{bmatrix} \tag{32}$$

Based on the central limit theorem, one can expect that, within each acceleration pattern, the second order derivative of acceleration $G(\delta_t)''=[G(\delta_t)''_x, G(\delta_t)''_y, G(\delta_t)''_z]^T$ is approximately multivariate normally distributed. Therefore, one can define the clusters of second order derivative acceleration as:

Definition 6.

Cluster of $G(\delta_t)''$

Centroid: $\mu(G(\delta_t)'')=[\mu(G(\delta_t)''_x), \mu(G(\delta_t)''_y), \mu(G(\delta_t)''_z)]^T$ within the clusters by Equation 31.

Radius: $r_x=k\cdot\sigma(G(\delta_t)''_x)$, $r_y=k\cdot\sigma(G(\delta_t)''_y)$, $r_z=k\cdot\sigma(G(\delta_t)''_z)$, where k is a float number $\geq 3$ and $[\sigma(G(\delta_t)''_x), \sigma(G(\delta_t)''_y), \sigma(G(\delta_t)''_z)]^T$ is given by Equation 32.

Hittime: h, number of data points are clustered to the clusters.

By the same concepts as in the previous section above, since acceleration is collected at three directions independently, covariance matrix $\Sigma(G(\delta_t)'')$ given by Equation 32 is a diagonal matrix. To reduce the complexity, one can simplify the cluster radius as defined in Definition (6), which defines the radius in three directions independently.

To construct clusters of $G(\delta_t)''$, an initial cluster radius is needed. Let $r(G(\delta_t)'')_0$ indicate this initial radius, which is defined as an expected value of $k\cdot\sigma(G(\delta_t)'')$. This expected value can be estimated by the experimental $G(\delta_t)''$ variance. Then the clustering algorithm is described as follows:

1. Assume an input $G(\delta_t)''=[G(\delta_t)''_x, G(\delta_t)''_y, G(\delta_t)''_z]^T$;
2. Compare $G(\delta_t)''$ with all the existing clusters if $G(\delta_t)''_x \in [\mu(G(\delta_t)''_x)_i - k\cdot\sigma(G(\delta_t)''_x)_i, \mu(G(\delta_t)''_x) + k\cdot\sigma(G(\delta_t)''_x)_i]$ and $G(\delta_t)''_y \in [\mu(G(\delta_t)''_y)_i - k\cdot\sigma(G(\delta_t)''_y)_i, \mu(G(\delta_t)''_y) + k\cdot\sigma(G(\delta_t)''_y)_i]$ and $G(\delta_t)''_z \in [\mu(G(\delta_t)''_z)_i - k\cdot\sigma(G(\delta_t)''_z)_i, \mu(G(\delta_t)''_z) + k\cdot\sigma(G(\delta_t)''_z)_i]$. If such a cluster exists, such as the ith cluster, the algorithm proceeds to step 3. If no such a cluster exists, the algorithm proceeds to step 4;
3. For the ith cluster, centroid and radius are updated by Equations 31 and 32 respectively. Hittime hi=hi+1;
4. A new cluster is created with centroid $G(\delta_t)''=[G(\delta_t)''_x, G(\delta_t)''_y, G(\delta_t)''_z]$ and radius $r(G(\delta_t)'')_0$, which is an initial radius. Set $h_i=1$.

Multiple clusters would be created after accumulating enough user data. Based on hittime of clusters, given an incoming $G(\delta_t)''=[G(\delta_t)''_x, G(\delta_t)''_y, G(\delta_t)''_z]$, the confidence degree $cf_{G(\delta_t)''}$ is defined as Equation 33.

$$cf_{G(\delta_t)''} = \frac{h_j}{\sum_{i=1}^{n} h_i} \tag{33}$$

where j represents the jth cluster to which $cf_{G(\delta_t)''}$ is clustered and n is the total number of the clusters.

Besides the confidence degree, $cf_{G(\delta_t)''}$, $ac_{G(\delta_t)''}$ is introduced to indicate the distance between the input data point $G(\delta_t)''$ and the centroid of the cluster that this data point falls into.

$$ac_{G(\delta_t)''} = \frac{1}{(2\pi)^{n/2}|\Sigma(G(\delta_t)'')|^{1/2}} \tag{34}$$

$$\exp\left(\frac{1}{2}(G(\delta_t)'' - \mu(G(\delta_t)''))^T \Sigma(G(\delta_t)'')^{-1}(G(\delta_t)'' - \mu(G(\delta_t)''))\right)$$

where $\mu(G(\delta_t)'')$, defined by Equation 31 is the centroid of the cluster that the data point $G(\delta_t)''$ falls into, $\Sigma(G(\delta_t)'')$, given by Equation 32 is the standard deviation of the cluster.

With respect to orientation, pre-processing and clustering module 430 may perform similar pre-processing and clustering as that described above with respect to acceleration. As discussed above, when a user uses user device 100, for each time interval $\delta_t$ defined by Definitions 1 and 2, three directional orientation values are captured independently by the gyroscopes. Mean, standard deviation, first order and second order derivative of these three directional orientation values are computed. These features are captured to form the user's pattern. As three directional acceleration and orientation are captured independently, one can assume these features of mean, standard deviation, first order derivative, and second order derivative on three directions, (x, y, and z), are independent variables. Here one can use the similar technique, multivariate normal distribution (Equation 19), to model these orientation features.

Equation 8 above gives the three axis gyroscope readings for a given time interval t. Since three axis x, y, and z are independent orientation variables, one can expect that these independent orientation variables are approximately normally distributed. In other words, $\overline{R}_p=[\overline{R}^x, \overline{R}^y, \overline{R}^z]^T$, within a user pattern, falls into a multivariate normal distribution with mean $\mu(\overline{R}_p)=[\mu(\overline{R}^x), \mu(\overline{R}^y), \mu(\overline{R}^z)]^T$ and covariance matrix $\mu(\overline{R}_p)$, which is described as follows:

$$p(\overline{R}_p; \mu(\overline{R}_p), \Sigma(\overline{R}_p)) = \frac{1}{(2\pi)^{n/2}|\Sigma(\overline{R}_p)|^{1/2}} \exp\left(\frac{1}{2}(\overline{R}_p - \mu(\overline{R}_p))^T \Sigma(\overline{R}_p)^{-1}(\overline{R}_p - \mu(\overline{R}_p))\right) \quad (35)$$

where $\overline{R}_p=[\overline{R}^x, \overline{R}^y, \overline{R}^z]^T$ is defined by Equation 9, $\mu(\overline{R}_p) = [\mu(\overline{R}^x), \mu(\overline{R}^y), \mu(\overline{R}^z)]^T$, which is given by Equation 36; covariance matrix $\Sigma(\overline{R}_p)$ is given by Equation 37.

$$\mu(\overline{R}_p) = \begin{pmatrix} \mu(\overline{R}^x) \\ \mu(\overline{R}^y) \\ \mu(\overline{R}^z) \end{pmatrix} = \begin{pmatrix} \frac{\sum_{i=1}^{n} \overline{R}_i^x}{n} \\ \frac{\sum_{i=1}^{m} \overline{R}_i^y}{m} \\ \frac{\sum_{i=1}^{l} \overline{R}_i^z}{l} \end{pmatrix} \quad (36)$$

$$\Sigma(\overline{R}_p) = \begin{bmatrix} \sigma^2(\overline{R}^x) & 0 & 0 \\ 0 & \sigma^2(\overline{R}^y) & 0 \\ 0 & 0 & \sigma^2(\overline{R}^z) \end{bmatrix} \quad (37)$$

where $\sigma(\bullet)$ represents the standard deviation of $\bullet$. For the computation of mean $\mu(\overline{R}_p)=[\mu(\overline{R}^x), \mu(\overline{R}^y), \mu(\overline{R}^z)]^T$ and covariance matrix $\Sigma(\overline{R}_p)$, the similar methods are used as illustrated in Equations 15 and 16.

Based on the central limit theorem, one can expect that, within each orientation pattern, the mean of orientation $\mu(\overline{R}_p)=[\mu(\overline{R}^x), \mu(\overline{R}^y), \mu(\overline{R}^z)]^T$ is approximately multivariate normally distributed. Therefore, based on empirical rule, almost all the data points within an orientation pattern fall in the space of three standard deviations around the means. Then the clusters of orientation may be defined as:

Definition 7.

Cluster of $\overline{R}_p$

Centroid: mean of $\overline{R}_p$, $\mu(\overline{R}_p)=[\mu(\overline{R}^x), \mu(\overline{R}^y), \mu(\overline{R}^z)]^T$, within the clusters by Equation 36.

Radius: $r_x=k\cdot\sigma(\overline{R}^x)$, $r_y=k\cdot\sigma(\overline{R}^y)$, and $r_z=k\cdot\sigma(\overline{R}^z)$ where k is a float number $\geq 3$ and $[\sigma(\overline{R}^x), \sigma(\overline{R}^y), \sigma(\overline{R}^z)]^T$ is given by Equation 37.

Hittime: h, number of data points are clustered to the clusters.

Since orientation is collected at three directions independently, one can assume that the readings from three-axis accelerometers are independent. This explains covariance matrix $\Sigma(\overline{R}_p)$ given by Equation 37 is a diagonal matrix. Ideally, if one can visualize the clusters of three-axis orientation, it should give a prolate spheroid. To reduce the complexity, the cluster radius is simplified as defined in Definition (7), which defines the radius in three directions independently.

To construct clusters of $\overline{R}_p$, an initial cluster radius is needed. Let $r(\overline{R}_p)_0$ indicate this initial radius, which is defined as an expected value of $k\cdot\sigma(\overline{R}_p)$. This expected value can be estimated by the experimental $\overline{R}_p$ variance. Then the clustering algorithm is described as follows:

1. Assume an input $\overline{R}_p=[\overline{R}^x, \overline{R}^y, \overline{R}^z]$;
2. Compare $\overline{R}_p$ with all the existing clusters if $\overline{R}^x \in [(\overline{R}^x)_i - k\cdot\sigma(\overline{R}^x)_i, \mu(\overline{R}^x)_i+k\cdot\sigma(\overline{R}^x)_i]$ and $\overline{G}^y \in [\mu(\overline{R}^y)_i - k\cdot\sigma(\overline{R}^y)_i, \mu(\overline{R}^y)_i+k\cdot\sigma(\overline{R}^y)_i]$ and $\overline{R}^z \in [\mu(\overline{R}^z)_i - k\cdot\sigma(\overline{R})_i, \mu(\overline{R}^z)_i+k\cdot\sigma(\overline{R})_i]$. If such a cluster exists, such as the ith cluster, the algorithm proceeds to step 3. If no such a cluster exists, the algorithm proceeds to step 4;
3. For the ith cluster, centroid and radius are updated by Equations (36) and (37), respectively. Hittime $h_i=h_i+1$;
4. A new cluster is created with centroid $\overline{R}_p=[\overline{R}^x, \overline{R}^y, \overline{R}^z]$ and radius $r(\overline{G}_p)_0$, which is an initial radius. Set $h_i=1$.

Multiple clusters would be created after accumulating enough user data. Based on hittime of clusters, given a incoming $\overline{R}_p=[\overline{R}^x, \overline{R}^y, \overline{R}^z]$, the confidence degree, $cf_{\overline{R}_p}$, is defined as Equation 38.

$$cf_{\overline{R}_p} = \frac{h_j}{\sum_{i=1}^{n} h_i} \quad (38)$$

where j represents the jth cluster to which $cf_{\overline{R}_p}$ is clustered and n is the total number of the clusters.

Besides the confidence degree, $cf_{\overline{R}_p}$, $ac_{\overline{R}_p}$ is introduced to indicate the distance between the input data point $\overline{R}_p$ and the centroid of the cluster that this data point falls into.

$$ac_{\overline{R}_p} = \frac{1}{(2\pi)^{n/2}|\Sigma(\overline{R}_p)|^{1/2}} \exp\left(\frac{1}{2}(\overline{R}_p - \mu(\overline{R}_p))^T \sum(\overline{R}_p)^{-1}(\overline{R}_p - \mu(\overline{R}_p))\right) \quad (39)$$

where $\mu(\overline{R}_p)$, defined by Equation 36, is the centroid of the cluster that the data point $\overline{R}_p$ falls into, $\Sigma(R_p)$, given by Equation 37, is the standard deviation of the cluster.

Equation 11 above gives the first order differentiation of orientation with respect to the time t, $R(\delta_t)'=[R(\delta_t)'_x, R(\delta_t)'_y, R(\delta_t)'_z]^T$. Since the three-axes x, y, and z are independent orientation variables, one can expect that, $R(\delta_t)'=[R(\delta_t)'_x, R(\delta_t)'_y, R(\delta_t)'_z]^T$, within a user pattern, falls into a multivariate normal distribution with mean $\mu(R(\delta_t)')=[\mu(R(\delta_t)'_x), \mu(R(\delta_t)'_y), \mu(R(\delta_t)'_z)]^T$ and covariance matrix $\Sigma(R(\delta_t)')$, which is described as follows:

$$p(R(\delta_t)'; \mu(R(\delta_t)'), \sum(R(\delta_t)')) = \frac{1}{(2\pi)^{n/2}|\sum(R(\delta_t)')|^{1/2}} \exp\left(\frac{1}{2}(R(\delta_t)' - \mu(R(\delta_t)'))^T \sum(R(\delta_t)')^{-1}(R(\delta_t)' - \mu(R(\delta_t)'))\right) \quad (40)$$

where $R(\delta_t)'=[R(\delta_t)'_x, R(\delta_t)'_y, R(\delta_t)'_z]^T$ is defined by Equation 11, $\mu(R(\delta_t)')=[\mu(R(\delta_t)'_x), \mu(R(\delta_t)'_y), \mu(R(\delta_t)'_z)]^T$, which is given by equation 41; covariance matrix $\Sigma(R(\delta_t)')$ is given by Equation 42.

$$\mu(R(\delta_t)') = \begin{pmatrix} \mu(R(\delta_t)'_x) \\ \mu(R(\delta_t)'_y) \\ \mu(R(\delta_t)'_z) \end{pmatrix} = \begin{pmatrix} \frac{\sum_{i=1}^{n} R(\delta_t)_x i'}{n} \\ \frac{\sum_{i=1}^{m} R(\delta_t)_y i'}{m} \\ \frac{\sum_{i=1}^{l} R(\delta_t)_z i'}{l} \end{pmatrix} \quad (41)$$

$$\sum(R(\delta_t)') = \begin{bmatrix} \sigma^2(R(\delta_t)'_x) & 0 & 0 \\ 0 & \sigma^2(R(\delta_t)'_y) & 0 \\ 0 & 0 & \sigma^2(R(\delta_t)'_z) \end{bmatrix} \quad (42)$$

Based on the central limit theorem, one can expect that, within each orientation pattern, the first order derivative of orientation $R(\delta_t)'=[R(\delta_t)'_x, R(\delta_t)'_y, R(\delta_t)'_z]^T$ is approximately multivariate normally distributed. Therefore, one can define the clusters of first order derivative orientation as:

Definition 8.

Cluster of $R(\delta_t)'$

Centroid: $\mu(R(\delta_t)')=[\mu(R(\delta_t)'_x), \mu(R(\delta_t)'_y), \mu(R(\delta_t)'_z)]^T$ within the clusters by Equation 41.

Radius: $r_x=k\cdot\sigma(R(\delta_t)'_x)$, $r_y=k\cdot\sigma(R(\delta_t)'_y)$, $r_z=k\cdot\sigma(R(\delta_t)'_z)$, where k is afloat number $\geq 3$ and $[\sigma(R(\delta_t)'_x), \sigma(R(\delta_t)'_y), \sigma(R(\delta_t)'_z)]^T$ is given by Equation 42.

Hittime: h, number of data points are clustered to the clusters.

By the same concepts described above for acceleration, since orientation is collected at three directions independently, covariance matrix $\Sigma(R(\delta_t)')$, given by Equation 42 is a diagonal matrix. To reduce the complexity, the cluster radius may be simplified as defined in Definition (8), which defines the radius in three directions independently.

To construct clusters of $R(\delta_t)'$, an initial cluster radius is needed. Let $r(R(\delta_t)')_0$ indicate this initial radius, which is defined as an expected value of $k\cdot\sigma(R(\delta_t)')$. It can be estimated by the experimental $R(\delta_t)'$ variance. Then the clustering algorithm is described as follows:

1. Assume an input $R(\delta_t)'=[R(\delta_t)'_x, R(\delta_t)'_y, R(\delta_t)'_z]^T$;
2. Compare $R(\delta_t)'$ with all the existing clusters if $R(\delta_t)'_x \in [\mu(R(\delta_t)'_x)_i - k\cdot\sigma(R(\delta_t)'_x)_i, \mu(R(\delta_t)'_x)_i + k\cdot\sigma(R(\delta_t)'_x)_i]$ and $R(\delta_t)'_y \in [(R(\delta_t)'_y)_i - k\cdot\sigma(R(\delta_t)'_y)_i, \mu(R(\delta_t)'_y)_i + k\cdot\sigma(R(\delta_t)'_y)_i]$ and $R(\delta_t)'_z \in [\mu(R(\delta_t)'_z)_i - k\cdot\sigma(R(\delta_t)'_z)_i, \mu(R(\delta_t)'_z)_i + k\cdot\sigma(R(\delta_t)'_z)_i]$. If such a cluster exists, such as the ith cluster, the algorithm proceeds to step 3. If no such a cluster exists, the algorithm proceeds to step 4;
3. For the ith cluster, centroid and radius are updated by Equations 41 and 42 respectively. Hittime $h_i=h_i+1$;
4. A new cluster is created with centroid $R(\delta_t)'=[R(\delta_t)'_x, R(\delta_t)'_y, R(\delta_t)'_z]$ and radius $r(R(\delta_t)')_0$, which is an initial radius. Set $h_i=1$.

Multiple clusters would be created after accumulating enough user data. Based on hittime of clusters, given an incoming $R(\delta_t)'=[R(\delta_t)'_x, R(\delta_t)'_y, R(\delta_t)'_z]$, the confidence degree $cf_{R(\delta_t)'}$ is defined as Equation 43.

$$cf_{R(\delta_t)'} = \frac{h_j}{\sum_{i=1}^{n} h_i} \quad (43)$$

where j represents the jth cluster to which $cf_{R(\delta_t)'}$ is clustered and n is the total number of the clusters.

Besides the confidence degree, $cf_{R(\delta_t)'}$, $ac_{R(\delta_t)'}$ is introduced to indicate the distance between the input data point $R(\delta_t)'$ and the centroid of the cluster that this data point falls into.

$$ac_{R(\delta_t)'} = \frac{1}{(2\pi)^{n/2}|\Sigma(R(\delta_t)')|^{1/2}} \exp\left(\frac{1}{2}(R(\delta_t)' - \mu(R(\delta_t)'))^T \sum(R(\delta_t)')^{-1}(R(\delta_t)' - \mu(R(\delta_t)'))\right) \quad (44)$$

where $\mu(R(\delta_t)')$, defined by Equation 41 is the centroid of the cluster that the data point R(d) falls into, $\Sigma(R(\delta_t)')$, given by Equation 42 is the standard deviation of the cluster.

Equation 12 above gives the second order differentiation of orientation with respect to the time t, $R(\delta_t)''=[R(\delta_t)''_x, R(\delta_t)''_y, R(\delta_t)''_z]^T$. Since the three axes x, y, and z are independent orientation variables, one can expect that, $R(\delta_t)''=[R(\delta_t)''_x, R(\delta_t)''_y, R(\delta_t)''_z]^T$, within a user pattern, falls into a multivariate normal distribution with mean $\mu(R(\delta_t)'')=[\mu(R(\delta_t)''_x), \mu(R(\delta_t)''_y), \mu(R(\delta_t)''_z)]^T$ and covariance matrix $\Sigma(R(\delta_t)'')$, which is described as follows:

$$p(R(\delta_t)''; \mu(R(\delta_t)''), \sum(R(\delta_t)'')) = \frac{1}{(2\pi)^{n/2}|\Sigma(R(\delta_t)'')|^{1/2}} \exp\left(\frac{1}{2}(R(\delta_t)'' - \mu(R(\delta_t)''))^T \sum(R(\delta_t)'')^{-1}(R(\delta_t)'' - \mu(R(\delta_t)''))\right) \quad (45)$$

where $R(\delta_t)''=[R(\delta_t)''_x, R(\delta_t)''_y, R(\delta_t)''_z]^T$ is defined by Equation 12, $\mu(R(\delta_t)'')=[\mu(R(\delta_t)''_x), \mu(R(\delta_t)''_y), \mu(R(\delta_t)''_z)]^T$, which is given by Equation 46; covariance matrix $\Sigma(R(\delta_t)')$ is given by Equation 47.

$$\mu(R(\delta_t)'') = \begin{pmatrix} \mu(R(\delta_t)''_x) \\ \mu(R(\delta_t)''_y) \\ \mu(R(\delta_t)''_z) \end{pmatrix} = \begin{pmatrix} \frac{\sum_{i=1}^{n} R(\delta_t)_x i''}{n} \\ \frac{\sum_{i=1}^{m} R(\delta_t)_y i''}{m} \\ \frac{\sum_{i=1}^{l} R(\delta_t)_z i''}{l} \end{pmatrix} \quad (46)$$

$$\sum(R(\delta_t)'') = \begin{bmatrix} \sigma^2(R(\delta_t)''_x) & 0 & 0 \\ 0 & \sigma^2(R(\delta_t)''_y) & 0 \\ 0 & 0 & \sigma^2(R(\delta_t)''_z) \end{bmatrix} \quad (47)$$

Based on the central limit theorem, one can expect that, within each orientation pattern, the second order derivative of orientation $R(\delta_t)''=[R(\delta_t)''_x, R(\delta_t)''_y, R(\delta_t)''_z]^T$ is approximately multivariate normally distributed. Therefore, one can define the clusters of second order derivative orientation as:

Definition 9.

Cluster of $R(\delta_t)''$

Centroid: $\mu(R(\delta_t)'')=[\mu(R(\delta_t)''_x), \mu(R(\delta_t)''_y), \mu(R(\delta_t)''_z)]^T$ within the clusters by Equation 31.

Radius: $r_x=k\cdot\sigma(R(\delta_t)''_x)$, $r_y=k\cdot\sigma(R(\delta_t)''_y)$, $r_z=k\cdot\sigma(R(\delta_t)''_z)$, where k is afloat number $\geq 3$ and $[\sigma(R(\delta_t)''_x), \sigma(R(\delta_t)''_y), \sigma(R(\delta_t)''_z)]^T$ is given by Equation 47.

Hittime: h, number of data points are clustered to the clusters.

By the same concepts described above, since orientation is collected at three directions independently, covariance matrix $\Sigma(R(\delta_t)'')$ given by Equation 47 is a diagonal matrix. To reduce the complexity, one can simplify the cluster radius as defined in Definition (9), which defines the radius in three directions independently.

To construct clusters of $R(\delta_t)''$, an initial cluster radius is needed. Let $r(R(\delta_t)'')_0$ indicate this initial radius, which is defined as an expected value of $k \cdot \sigma(R(\delta_t)'')$. This expected value can be estimated by the experimental $R(\delta_t)''$ variance. Then the clustering algorithm is described as follows:

1. Assume an input $R(\delta_t)''=[R(\delta_t)''_x, R(\delta_t)''_y, R(\delta_t)''_z]^T$;
2. Compare $R(\delta_t)''$ with all the existing clusters if $R(\delta_t)''_x \in [(R(\delta_t)''_x)_i - k \cdot \sigma(R(\delta_t)''_x)_i, \mu(R(\delta_t)''_x) + k \cdot \sigma(R(\delta_t)''_x)_i]$ and $R(\delta_t)''_y \in [\mu(R(\delta_t)''_y)_i - k \cdot \sigma(R(\delta_t)''_y)_i, \mu(R(\delta_t)''_y) + k \cdot \sigma(R(\delta_t)''_y)_i]$ and $R(\delta_t)''_z \in [\mu(R(\delta_t)''_z)_i - k \cdot \sigma(R(\delta_t)''_z)_i, \mu(R(\delta_t)''_z) + k \cdot \sigma(R(\delta_t)''_z)_i]$. If such a cluster exists, such as the ith cluster, the algorithm proceeds to step 3. If no such a cluster exists, the algorithm proceeds to step 4;
3. For the ith cluster, centroid and radius are updated by Equations 46 and 47 respectively. Hittime $hi=hi+1$;
4. A new cluster is created with centroid $R(\delta_t)''=[R(\delta_t)''_x, R(\delta_t)''_y, R(\delta_t)''_z]$ and radius $r(R(\delta_t)'')_0$, which is an initial radius. Set $h_i=1$.

Multiple clusters would be created after accumulating enough user data. Based on hittime of clusters, given an incoming $R(\delta_t)''=[R(\delta_t)''_x, R(\delta_t)''_y, R(\delta_t)''_z]$, the confidence degree $cf_{R(\delta_t)''}$ is defined as Equation 48.

$$cf_{R(\delta_t)''} = \frac{h_j}{\sum_{i=1}^{n} h_i} \quad (48)$$

where j represents the jth cluster to which $cf_{R(\delta_t)''}$ is clustered and n is the total number of the clusters.

Besides the confidence degree, $cf_{R(\delta_t)''}$, $ac_{R(\delta_t)''}$ is introduced to indicate the distance between the input data point $R(\delta_t)''$ and the centroid of the cluster that this data point falls into.

$$ac_{R(\delta_t)''} = \frac{1}{(2\pi)^{n/2} |\Sigma(R(\delta_t)'')|^{1/2}}$$
$$\exp\left(\frac{1}{2}(R(\delta_t)'' - \mu(R(\delta_t)''))^T \sum (R(\delta_t)'')^{-1}(R(\delta_t)'' - \mu(R(\delta_t)''))\right) \quad (49)$$

where $\mu(R(\delta_t)'')$, defined by Equation 46 is the centroid of the cluster that the data point $R(\delta_t)''$ falls into, $\Sigma(R(\delta_t)'')$, given by Equation 47 is the standard deviation of the cluster.

Pre-processing and clustering module 430 may store (e.g., in memory 310) cluster data for each vertex and edge in a directed graph (e.g., directed graph 500) corresponding to a particular keypad arrangement.

Referring again to FIG. 4, pattern learning module 440 may identify patterns based on data from pre-processing and clustering module 430 described above. In one implementation, pattern learning module 440 may format data from pre-processing and clustering module 430 as described below.

As described above, the graph $G=<V, E>$ is used to represent the user pattern, where $v_i \in V$ represents an event that the ith key has been clicked and $e_{i,j} \in E$ indicates the events between the ith and jth keys have been clicked. A time interval $\delta t$ has been defined (Definition 1 and 2) for both events of $v_i \in V$ and $e_{i,j} \in E$.

Given a sequence of keys of clicking, $<key_1, key_2, \ldots, key_i, \ldots, key_n>$, an event sequence $<v_1, e_{1,2}, v_2, e_{2,3}, \ldots,$ $e_{i-1,i}, v_i, e_{i,i+1}, \ldots, e_{n-1,n}, v_n>$ is generated. As discussed above, one can cluster the $\delta t$, $\overline{G}_p$, $\overline{G}_p'$, $\overline{G}_p''$, $\overline{R}_p$, $\overline{R}_p'$, and $\overline{R}_p''$ on both vertices and edges. For each of these cluster sets, a cluster ID is allocated to each cluster. For example, assume cluster set of $\delta t < C_{\delta t} 1, C_{\delta t} 2, \ldots, C_{\delta t} n >$. Let $CID_{\delta t} \in [1, \#C_{\delta t}]$ stand as the current (this time) ID of a cluster, where $\#C_{\delta t}$ is the size of the cluster set. Generally say, CID● represents the current cluster ID of ● and #C● stands as the size of the cluster set of ●. Therefore, given the input $\delta t$, $\overline{G}_p$, $\overline{G}_p'$, $\overline{G}_p''$, $\overline{R}_p$, $\overline{R}_p'$, and $\overline{R}_p''$, the pre-processing and cluster process gives us the cluster IDs described in Table 1 both on $v_i \in V$ and $e_{i,j} \in E$.

TABLE 1

| ID | Values | Range | Description |
|---|---|---|---|
| 1 | $CID_{\delta t}$ | $\in [1, \#C_{\delta t}]$ | Cluster ID of $\delta t$ by Definition (3) |
| 2 | $CID_{\overline{G}_p}$ | $\in [1, \#C_{\overline{G}_p}]$ | Cluster ID of $\overline{G}_p$ by Definition (4) |
| 3 | $CID_{\overline{G}_p'}$ | $\in [1, \#C_{\overline{G}_p'}]$ | Cluster ID of $\overline{G}_p'$ by Definition (5) |
| 4 | $CID_{\overline{G}_p''}$ | $\in [1, \#C_{\overline{G}_p''}]$ | Cluster ID of $\overline{G}_p''$ by Definition (6) |
| 5 | $CID_{\overline{R}_p}$ | $\in [1, \#C_{\overline{R}_p}]$ | Cluster ID of $\overline{R}_p$ by Definition (7) |
| 6 | $CID_{\overline{R}_p'}$ | $\in [1, \#C_{\overline{R}_p'}]$ | Cluster ID of $\overline{R}_p'$ by Definition (8) |
| 7 | $CID_{\overline{R}_p''}$ | $\in [1, \#C_{\overline{R}_p''}]$ | Cluster ID of $\overline{R}_p''$ by Definition (9) |

For each CID, there is a confidence value cf●, which is associated with a CID●. The confidence level describes the degree of trust of this event based on the historical user data. The more certain that a pattern happened, the higher the confidence values. The range of cf● is [0,1], where greater confidence values indicate higher reliability of an estimate. Table 2 gives the corresponding confidence values for $\delta t$, $\overline{G}_p$, $\overline{G}_p'$, $\overline{G}_p''$, $\overline{R}_p$, $\overline{R}_p'$, and $\overline{R}_p''$.

TABLE 2

| ID | Values | Range | Description |
|---|---|---|---|
| 1 | $CID_{\delta t}$ | $cf_{\delta t}$ | Equation 17 |
| 2 | $CID_{\overline{G}_p}$ | $cf_{\overline{G}_p}$ | Equation 23 |
| 3 | $CID_{\overline{G}_p'}$ | $cf_{\overline{G}_p'}$ | Equation 28 |
| 4 | $CID_{\overline{G}_p''}$ | $cf_{\overline{G}_p''}$ | Equation 33 |
| 5 | $CID_{\overline{R}_p}$ | $cf_{\overline{R}_p}$ | Equation 38 |
| 6 | $CID_{\overline{R}_p'}$ | $cf_{\overline{R}_p'}$ | Equation 43 |
| 7 | $CID_{\overline{R}_p''}$ | $cf_{\overline{R}_p''}$ | Equation 48 |

An event can be defined as clicking a key down-up or clicking two keys up-down. For each event, $\delta t$, $\overline{G}_p$, $\overline{G}_p'$, $\overline{G}_p''$, $\overline{R}_p$, $\overline{R}_p'$, and $\overline{R}_p''$ are captured and corresponding clusters are located. Based on the user historical data, each cluster has a confidence value to indicate the likelihood (or probability) that the events fall into this pattern. Table 2 gives the computation of the confidence values for events. Therefore, for one event, there are a total of seven confidence values. One can simply take the average of these seven confidence values as the confidence of this event.

$$cf_e = \frac{\sum_{i=1}^{n} cf}{n} \quad (50)$$

where n=7 and ●$\in \{\delta t, \overline{G}_p, \overline{G}_p', \overline{G}_p'', \overline{R}_p, \overline{R}_p', \overline{R}_p''\}$.

Given an event sequence $<v_1, e_{1,2}, v_2, e_{2,3}, \ldots, e_{i-1,i}, v_i,$ $e_{i,i+1}, \ldots, e_{n-1,n}, v_n>$ with each event having a confidence $cf_e$ (given by Equation 50). Equation 51 gives the overall confidence of the given event sequence.

$$cf_{es} = \frac{\sum_{i=1}^{n} cf_{e_1}}{n} \quad (51)$$

where n here refers to the size of the given event sequence and $cf_{e_i}$ is the ith event confidence degree. Equation 51 defines the event sequence confidence as the average of each component. In one implementation, the event sequence may correspond to a login sequence or a response to a challenge event.

Pattern comparison module 450 may compare the event sequence confidence score for a particular sequence with a threshold score to determine the event sequence is a match for a user biometric pattern. In one implementation, pattern comparison module 450 may modify the threshold score based on the amount of event data. Pattern comparison module 450 may provide a determination to security manager 410. For example, if the event sequence confidence score for the particular sequence is below the threshold score, pattern comparison module 450 may indicate the user biometric pattern does not match a stored user pattern. Conversely, if the event sequence confidence score for the particular sequence is above the threshold score, pattern comparison module 450 may indicate the user biometric pattern matches the stored user pattern.

As described above, comparison module 450 may compare the biometric pattern to stored user patterns based on the time of day, day of week, location, etc. The more the user historical data is accumulated, the more accurate confidence degree would be calculated. Based on the definition of confidence degree of events, the confidence degree should have a high confidence value at the beginning of data accumulation. As long as the model learns the user pattern, the model corrects or refines the prediction automatically over time.

In some instances the pattern might be sparse. A sparse pattern means: given an event, confidence degrees of pattern of $\delta t, \overline{G}_p, \overline{G}_p', \overline{G}_p'', \overline{R}_p, \overline{R}_p'$, and $\overline{R}_p''$ might be relatively small values. In other words, a confidence degree cf is a float number ranging in interval [0; 1] and, under the most cases, cf might be a value close to zero side. To handle such cases, a normalization process may be needed.

FIG. 7 is a flow chart of an exemplary process 700 for identifying a user biometric pattern, according to an implementation described herein. In one implementation, process 700 may be performed by user device 100. In another implementation, some or all of process 700 may be performed by another device or group of devices in conjunction with user device 100. For example, some parts of process 700 may be performed by backend device connected via a network, such as a server device, in conjunction with user device 100.

As shown in FIG. 7, process 700 may include collect timing data for multiple touch events of button or transition time between two buttons (block 705), and collect force data indicating screen touch force behavior during the multiple touch events (block 710). For example, as described in connection with FIG. 4, data collectors 420 may record data from sensors 350. In one implementation, data collectors 420 may identify timing of touches and associated movement (e.g., acceleration and orientation) of user device 100 during a user input event.

Process 700 may further include identifying a user biometric pattern for the multiple touch events based on the timing and/or force data (block 715). For example, pre-processing and clustering module 430 may perform processing and clustering for timing data, acceleration data, and orientation data obtained from sensors 350. Clusters may be formed for each vertex (e.g., button 110) and edge (between buttons 110) in a directed graph corresponding to a particular virtual keypad. For each vertex and edge, pre-processing and clustering module 430 may apply a clustering algorithm for mean and standard deviation of the timing ($\delta t$); for acceleration against the mean/standard deviation ($\overline{G}_p$), first order derivative ($\overline{G}_p'$), and second order derivative ($\overline{G}_p''$) on three directions (e.g., x, y, and z); and for orientation against the mean/standard deviation ($\overline{R}_p$), first order derivative ($\overline{R}_p'$), and second order derivative ($\overline{R}_p''$) on three directions.

Process 700 may also include storing user biometric pattern associated with particular button or transition between two buttons (block 720). For example, pre-processing and clustering module 430 may store (e.g., in memory 310) cluster data for each vertex and edge in a directed graph corresponding to a particular keypad arrangement.

Process 700 may further include receiving timing data for new touch event (block 725), and receiving new force data for the new touch event (block 730). For example, when a new touch event occurs, data collectors 420 may receive timing and force (e.g., acceleration and/or orientation) data for the new touch event.

Process 700 may also include determining if the new timing/force data matches user biometric pattern (block 735). For example, pre-processing and clustering module 430 may format the timing and force data similar to that described above in block 715. More particularly, $\delta t, \overline{G}_p, \overline{G}_p', \overline{G}_p'', \overline{R}_p, \overline{R}_p'$, and $\overline{R}_p''$, as described above, may be captured and corresponding clusters located from the stored biometric patterns in memory 310. Based on the user historical data, each cluster has a confidence value to indicate the likelihood (or probability) that the events fall into this pattern. For one event, there may be a total of seven confidence values, as described above with respect to Tables 1 and 2, such that the average of these seven confidence values can be taken as the confidence of the new touch event. In another implementation, confidence values for a series of touch events may be evaluated with an average of the confidence values from sequential touch events.

If the new timing/force data matches user biometric pattern (block 735—yes), process 700 may include authenticating the user and updating the user biometric pattern (block 740). For example, if pattern comparison module 450 determines that the new touch event or sequence is within a threshold confidence value, pattern comparison module 450 indicate the user is authenticated and may update clusters in memory 310 with the new touch data.

If the new timing/force data does not match the user biometric pattern (block 735—no), process 700 may include rejecting and/or flagging user input corresponding to the new touch event (block 745). For example, if pattern comparison module 450 determines that the new touch event or sequence is not within a threshold confidence value, pattern comparison module 450 may signal that security manager 410 should reject the user input or indicate that the pattern comparison failed.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, a user pattern trained by finger touch sensitive features has been described. Besides these features, non-sensitive finger touch features could be included to build the user pattern as well. Some examples are geo-location (latitude-longitude can be captured by smart phone GPS sensor) and/or user direction (direction information as detected by a compass in the user device).

Additionally, while particular formulas/equations have described, other formulas/equations may be used to generate biometric pattern information. Furthermore, in some implementations, sensors 350 may include force sensors to directly determine touch forces. Also, while series of blocks have been described with respect to FIG. 7, the order of the blocks may be modified in other implementations. Further, non-dependent blocks may be performed in parallel.

It will be apparent that different embodiments described above may be implemented in many different forms of software, firmware, and hardware in the implementations illustrated in the figures. The actual software code or specialized control hardware used in the implementations does not limit the invention. Thus, the operation and behavior of these embodiments were described without reference to the specific software code—it being understood that software and control hardware can be designed to implement these embodiments based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    collecting, by a user device, timing data that indicates screen touch timing behavior during multiple touch events for a sequence of keys, wherein the timing data for each of the multiple touch events is associated with at least one of a hold time for a particular button or a transition time between two particular buttons;
    collecting, by the user device, force data indicating screen touch force behavior during the multiple touch events, wherein the force data for each of the multiple touch events includes acceleration values and orientation values for the user device, wherein the acceleration values includes three directional acceleration values that are captured independently and the orientation values include three directional orientation values that are captured independently;
    identifying, by the user device, a user biometric pattern for the multiple touch events, wherein the user biometric pattern is based on the timing data and the force data and includes, for each of the multiple touch events, a time interval, the acceleration values over the time interval, a first order acceleration derivative, a second order acceleration derivative, the orientation values over the time interval, a first order orientation derivative, and a second order orientation derivative;
    storing, by the user device, the user biometric pattern associated with the multiple touch events;
    presenting, by the user device, a challenge to solicit new touch events for the sequence of keys;
    obtaining, by the user device, new timing data for the new touch events;
    obtaining, by the user device, new force data for the new touch events;
    comparing, by the user device, the new timing data and the new force data to the user biometric pattern;
    determining, by the user device and based on the comparing, if the new timing data and the new force data correspond to the user biometric pattern; and
    preventing access to one of the user device or an application stored on the user device when the new timing data and the new force data do not correspond to the user biometric pattern.

2. The method of claim 1, wherein the identifying further comprises:
    generating a directed graph corresponding to a particular keypad arrangement, and identifying clusters for each vertex and each edge in the directed graph.

3. The method of claim 1, wherein the determining includes identifying an overall confidence value based on the new timing data and the new force data.

4. The method of claim 3, wherein identifying the overall confidence value includes:
    identifying a confidence value for each of the multiple touch events, and
    averaging the confidence values to generate the overall confidence value.

5. The method of claim 1, wherein the timing data for each of the multiple touch events includes:
    a timestamp of a down click and a timestamp of an up click for a single button, or
    a timestamp of an up click for a first button and a timestamp of a down click for a second button.

6. The method of claim 1, wherein the identifying the user biometric pattern includes, for each of the multiple touch events, constructing a cluster of the timing data and constructing a cluster of the force data.

7. The method of claim 6, wherein the identifying the user biometric pattern further includes identifying a centroid and a radius for each cluster of the timing data and each cluster of the force data.

8. The method of claim 1, wherein
    presenting the challenge to solicit new touch events includes:
    soliciting one of a password, a secret code, or an input pattern; or
    display an alphanumeric sequence that has to be entered by the user.

9. The method of claim 8, wherein determining if the new timing data and the new force data correspond to the user biometric pattern further comprises:
    comparing content of the new touch events with content of the sequence of keys.

10. A device, comprising:
    a memory configured to store a plurality of instructions; and
    a processor configured to execute instructions in the memory to:
        collect timing data that indicates screen touch timing behavior during multiple touch events for a sequence of keys, wherein the timing data for each of the multiple touch events is associated with at least one of a hold time for a particular button or a transition time between two particular buttons,
        collect force data indicating screen touch force behavior during the multiple touch events, wherein the force data for each of the multiple touch events includes acceleration values and orientation values for the device, wherein the acceleration values includes three directional acceleration values that are captured independently and the orientation values include three directional orientation values that are captured independently, identify a user biometric pattern for the multiple touch events, wherein the user biometric pattern is based on the timing data and the force data and includes, for each of the multiple touch events, a time interval, the acceleration values over the time interval, a first order acceleration derivative, a second order acceleration derivative, the orientation values over the time interval, a first order orientation derivative, and a second order orientation derivative, store the user biometric pattern associated with the multiple touch events, present a challenge to solicit new touch events for the sequence of keys, obtain new timing data for the new touch events, obtain new force data for the new touch events, compare the new timing data and the new force data to the user biometric pattern, determine, based on the comparing, if the new timing data and the new force data correspond to the user biometric pattern, and prevent access to one of the device or an application stored on the device when the new timing data and the new force data do not correspond to the user biometric pattern.

11. The device of claim 10, wherein, when identifying the user biometric pattern, the processor is further configured to:
generate a directed graph corresponding to a particular keypad arrangement, and identify clusters for each vertex and each edge in the directed graph.

12. The device of claim 10, wherein when determining if the new timing data and the new force data correspond to the user biometric pattern, the processor is further configured to:
identify an overall confidence value based on the new timing data and the new force data.

13. The device of claim 12, wherein when identifying the overall confidence value, the processor is further configured to:
identify a confidence value for each of the multiple touch events, and
average the confidence values.

14. The device of claim 10, wherein the timing data for each of the multiple touch events includes at least one of:
a timestamp of a down click and a timestamp of an up click for a single button, or
a timestamp of an up click for a first button and a timestamp of a down click for a second button.

15. The device of claim 10, wherein, when identifying the user biometric pattern, the processor is further configured to:
construct, for each of the multiple touch events, a timing cluster of the timing data that identifies a centroid and a radius of the timing cluster, and
construct, for each of the multiple touch events, a force cluster of the force data that identifies a centroid and a radius of the force cluster.

16. A non-transitory computer-readable medium storing instructions executable by a computational device to:
collect timing data that indicates screen touch timing behavior during multiple touch events for a sequence of keys, wherein the timing data for each of the multiple touch events is associated with at least one of a hold time for a particular button or a transition time between two particular buttons, collect force data indicating screen touch force behavior during the multiple touch events, wherein the force data for each of the multiple touch events includes acceleration values and orientation values for the computational device, wherein the acceleration values includes three directional acceleration values that are captured independently and the orientation values include three directional orientation values that are captured independently, identify a user biometric pattern for the multiple touch events, wherein the user biometric pattern is based on the timing data and the force data and includes, for each of the multiple touch events, a time interval, the acceleration values over the time interval, a first order acceleration derivative, a second order acceleration derivative, the orientation values over the time interval, a first order orientation derivative, and a second order orientation derivative, store the user biometric pattern associated with the multiple touch events, present a challenge to solicit new touch events for the sequence of keys, obtain new timing data for the new touch events, obtain new force data for the new touch events, compare the new timing data and the new force data to the user biometric pattern, determine, based on the comparing, if the new timing data and the new force data correspond to the user biometric pattern, and prevent access to one of the computational device or an application stored on the computational device when the new timing data and the new force data do not correspond to the user biometric pattern.

17. The non-transitory computer-readable medium of claim 16, wherein the instructions to identify the user biometric pattern further comprise instructions to:
generate a directed graph corresponding to a particular keypad arrangement, and identifying clusters for each vertex and each edge in the directed graph.

18. The non-transitory computer-readable medium of claim 16, wherein the instructions to identify the user biometric pattern further comprise instructions to:
for each of the multiple touch events, construct a cluster of the timing data and construct a cluster of the force data, and
identify a centroid and a radius for each cluster of the timing data and each cluster of the force data.

19. The non-transitory computer-readable medium of claim 16, wherein the instructions to determine if the new timing data and the new force data correspond to the user biometric pattern further comprise instructions to:
identify an overall confidence value based on the new timing data and the new force data.

20. The non-transitory computer-readable medium of claim 19, wherein the instructions to identify the overall confidence value further comprise instructions to:
identify a confidence value for each of the multiple touch events, and
average the confidence values.

* * * * *